(12) United States Patent
Watarai et al.

(10) Patent No.: US 9,457,868 B2
(45) Date of Patent: Oct. 4, 2016

(54) BICYCLE HYDRAULIC QUICK-RELEASE APPARATUS AND BICYCLE FRAME

(71) Applicant: SHIMANO INC., Sakai (JP)

(72) Inventors: Etsuyoshi Watarai, Sakai (JP); Osamu Kariyama, Sakai (JP); Tatsuya Matsushita, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/555,704

(22) Filed: Nov. 28, 2014

(65) Prior Publication Data

US 2016/0039492 A1 Feb. 11, 2016

Related U.S. Application Data

(63) Continuation-in-part of application No. 14/453,584, filed on Aug. 6, 2014, now abandoned.

(51) Int. Cl.
*B62L 3/02* (2006.01)
*B62K 19/00* (2006.01)

(52) U.S. Cl.
CPC ............... *B62L 3/023* (2013.01); *B62K 19/00* (2013.01)

(58) Field of Classification Search
None
See application file for complete search history.

(56) References Cited

U.S. PATENT DOCUMENTS

| 3,554,334 A | * | 1/1971 | Shimano | B62L 3/023 188/24.16 |
|---|---|---|---|---|
| 2007/0283692 A1 | * | 12/2007 | Tetsuka | B60T 7/102 60/594 |
| 2010/0051394 A1 | * | 3/2010 | Tsai | B62L 3/023 188/72.5 |
| 2011/0011684 A1 | | 1/2011 | Tetsuka et al. | |
| 2011/0290595 A1 | | 12/2011 | Nago | |
| 2011/0290601 A1 | * | 12/2011 | Lin | B60T 7/102 188/152 |
| 2014/0109567 A1 | | 4/2014 | Hujer et al. | |
| 2014/0174244 A1 | * | 6/2014 | Watarai | B62M 25/00 74/502.2 |
| 2014/0318306 A1 | * | 10/2014 | Tetsuka | B62M 25/08 74/502.2 |

FOREIGN PATENT DOCUMENTS

| DE | 20 2005 020 175 U1 | 3/2006 |
|---|---|---|
| DE | 10 2011 078 153 | 12/2012 |
| EP | 1437235 | 7/2004 |

* cited by examiner

*Primary Examiner* — Tony Winner
(74) *Attorney, Agent, or Firm* — Mori & Ward, LLP

(57) ABSTRACT

A bicycle hydraulic quick-release apparatus comprises a main body and a hydraulic chamber. The main body includes a first hole and a second hole. The hydraulic chamber has a changeable volume and is provided between the first hole and the second hole. The hydraulic chamber is configured to be in a first chamber state where a volume of the hydraulic chamber is a first volume. The hydraulic chamber is configured to be in a second chamber state where the volume of the hydraulic chamber is a second volume different from the first volume. The hydraulic chamber is disconnected from the first hole in the second chamber state.

28 Claims, 34 Drawing Sheets

BICYCLE HYDRAULIC QUICK-RELEASE APPARATUS AND BICYCLE FRAME

CROSS-REFERENCE TO RELATED APPLICATIONS

The present application is a continuation-in-part application of the U.S. patent application Ser. No. 14/453,584 filed Aug. 6, 2014. The contents of this application are incorporated herein by reference in their entirety.

BACKGROUND OF THE INVENTION

1. Field of the Invention

The present invention relates to a bicycle hydraulic quick-release apparatus and a bicycle frame.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle braking system.

Bicycle braking systems include a pair of friction members for applying a braking force to a rotatable body such as a wheel or a disc brake rotor secured to the wheel. The friction members are positioned adjacent to the rotatable body for quick response.

SUMMARY OF THE INVENTION

In accordance with a first aspect of the present invention, a bicycle hydraulic quick-release apparatus comprises a main body and a hydraulic chamber. The main body includes a first hole and a second hole. The hydraulic chamber has a changeable volume and is provided between the first hole and the second hole. The hydraulic chamber is configured to be in a first chamber state where a volume of the hydraulic chamber is a first volume. The hydraulic chamber is configured to be in a second chamber state where the volume of the hydraulic chamber is a second volume different from the first volume. The hydraulic chamber is disconnected from the first hole in the second chamber state.

In accordance with a second aspect of the present invention, the bicycle hydraulic quick-release apparatus according to the first aspect is configured so that the second volume is greater than the first volume.

In accordance with a third aspect of the present invention, the bicycle hydraulic quick-release apparatus according to the first aspect is configured so that the main body includes a housing and a piston. The housing includes a cylinder bore. The piston is movably provided in the cylinder bore. The hydraulic chamber is defined by the housing and the piston.

In accordance with a fourth aspect of the present invention, the bicycle hydraulic quick-release apparatus according to the third aspect is configured so that the first hole and the second hole are provided at the housing.

In accordance with a fifth aspect of the present invention, the bicycle hydraulic quick-release apparatus according to the third aspect is configured so that the main body is configured so as to switch the hydraulic chamber between the first chamber state and the second chamber state in accordance with a relative position between the housing and the piston.

In accordance with a sixth aspect of the present invention, the bicycle hydraulic quick-release apparatus according to the fifth aspect is configured so that the piston is disposed at a first position relative to the housing in the first chamber state of the hydraulic chamber. The piston is disposed at a second position relative to the housing in the second chamber state of the hydraulic chamber. The piston includes a fluid passageway. The fluid passageway is connected to the first hole in a state where the piston is disposed at the first position. The fluid passageway is disconnected from the first hole in a state where the piston is disposed at the second position.

In accordance with a seventh aspect of the present invention, the bicycle hydraulic quick-release apparatus according to the sixth aspect further comprises a positioning structure configured to adjustably position the piston relative to the housing.

In accordance with an eighth aspect of the present invention, the bicycle hydraulic quick-release apparatus according to the seventh aspect is configured so that the positioning structure is configured to position the piston at the first position so that the hydraulic chamber is in the first chamber state. The positioning structure is configured to position the piston at the second position so that the hydraulic chamber is in the second chamber state.

In accordance with a ninth aspect of the present invention, the bicycle hydraulic quick-release apparatus according to the seventh aspect is configured so that the positioning structure includes a coupling member configured to couple the piston to the housing so that the piston is positioned on at least one of the first position and the second position.

In accordance with a tenth aspect of the present invention, the bicycle hydraulic quick-release apparatus according to the seventh aspect is configured so that the positioning structure includes a biasing member configured to bias the piston toward the second position.

In accordance with an eleventh aspect of the present invention, the bicycle hydraulic quick-release apparatus according to the tenth aspect is configured so that the biasing member is provided in the hydraulic chamber.

In accordance with a twelfth aspect of the present invention, the bicycle hydraulic quick-release apparatus according to the tenth aspect is configured so that the positioning structure includes a coupling member configured to couple the piston to the housing so that the piston is positioned on at least one of the first position and the second position against a biasing force from the biasing member.

In accordance with a thirteenth aspect of the present invention, the bicycle hydraulic quick-release apparatus according to the seventh aspect is configured so that the positioning structure includes an operating member and a knock mechanism. The operating member is movable relative to the housing in an axial direction in which the piston is movable relative to the housing. The knock mechanism is configured to switch a position of the piston between the first position and the second position in response to axial movement of the operating member.

In accordance with a fourteenth aspect of the present invention, the bicycle hydraulic quick-release apparatus according to the first aspect is configured so that the hydraulic chamber is connected to the first hole and the second hole in the first chamber state.

In accordance with a fifteenth aspect of the present invention, the bicycle hydraulic quick-release apparatus according to the first aspect is configured so that the main body includes a flexible tube. The flexible tube includes a first end and a second end opposite to the first end. The first hole is provided at the first end of the flexible tube. The second hole is provided at the second end of the flexible tube. The hydraulic chamber is provided in the flexible tube.

In accordance with a sixteenth aspect of the present invention, the bicycle hydraulic quick-release apparatus according to the fifteenth aspect is configured so that the main body includes a first holding member and a second holding member. The second holding member is configured to hold the flexible tube together with the first holding member to restrict the flexible tube from expanding in a radial direction of the flexible tube in response to hydraulic pressure in the hydraulic chamber.

In accordance with a seventeenth aspect of the present invention, the bicycle hydraulic quick-release apparatus according to the sixteenth aspect is configured so that the second holding member is movable relative to the first holding member between a first position and a second position to keep restricting the flexible tube from expanding in the radial direction.

In accordance with an eighteenth aspect of the present invention, the bicycle hydraulic quick-release apparatus according to the seventeenth aspect is configured so that the second holding member includes a pressing member configured to press the flexible tube in response to movement of the second holding member from the first position to the second position so as to change the volume of the hydraulic chamber from the first volume to the second volume.

In accordance with a nineteenth aspect of the present invention, the bicycle hydraulic quick-release apparatus according to the eighteenth aspect further comprises a positioning structure configured to position the second holding member at the second position.

In accordance with a twentieth aspect of the present invention, the bicycle hydraulic quick-release apparatus according to the nineteenth aspect is configured so that the positioning structure includes a biasing member configured to bias the second holding member toward the first position.

In accordance with a twenty-first aspect of the present invention, the bicycle hydraulic quick-release apparatus according to the first aspect is configured so that the hydraulic chamber is configured to be in the second chamber state when a bicycle component is detached from a bicycle frame.

In accordance with a twenty-second aspect of the present invention, the bicycle hydraulic quick-release apparatus according to the twenty-first aspect is configured so that the main body is configured to be provided in the bicycle frame.

In accordance with a twenty-third aspect of the present invention, the bicycle hydraulic quick-release apparatus according to the twenty-first aspect is configured so that the hydraulic chamber is configured to be in the first chamber state when the bicycle component is attached to the bicycle frame.

In accordance with a twenty-fourth aspect of the present invention, the bicycle hydraulic quick-release apparatus according to the twenty-third aspect is configured so that the hydraulic chamber is configured to be in the second chamber state when a wheel is detached from the bicycle frame. The hydraulic chamber is configured to be in the first chamber state when the wheel is attached to the bicycle frame.

In accordance with a twenty-fifth aspect of the present invention, the bicycle hydraulic quick-release apparatus according to the twenty-third aspect is configured so that the hydraulic chamber is configured to be in the second chamber state when the bicycle component is detached from a front fork of the bicycle frame. The hydraulic chamber is configured to be in the first chamber state when the bicycle component is attached to the front fork of the bicycle frame. The main body is configured to be at least partially disposed in an inner cavity provided inside the front fork.

In accordance with a twenty-sixth aspect of the present invention, the bicycle hydraulic quick-release apparatus according to the twenty-third aspect is configured so that the hydraulic chamber is configured to be in the second chamber state when the bicycle component is detached from a rear part of the bicycle frame. The hydraulic chamber is configured to be in the first chamber state when the bicycle component is attached to the rear part of the bicycle frame. The main body is configured to be at least partially disposed in an inner cavity provided inside the rear part.

In accordance with a twenty-seventh aspect of the present invention, a bicycle hydraulic quick-release apparatus comprises a main body and a hydraulic chamber. The main body includes a first hole, a second hole, a housing, and a piston. The housing includes a cylinder bore. The piston is movably provided in the cylinder bore. The hydraulic chamber has a changeable volume and is provided between the first hole and the second hole. The hydraulic chamber is configured to be in a first chamber state where a volume of the hydraulic chamber is a first volume. The hydraulic chamber is configured to be in a second chamber state where the volume of the hydraulic chamber is a second volume different from the first volume. The hydraulic chamber is disconnected from the first hole in the second chamber state. The hydraulic chamber is defined by the housing and the piston. The main body is configured so as to switch the hydraulic chamber between the first chamber state and the second chamber state in accordance with a relative position between the housing and the piston. The hydraulic chamber is configured to be in the second chamber state when a bicycle component is detached from a bicycle frame. One of the housing and the piston is configured to be in contact with the bicycle component to change the relative position between the housing and the piston.

In accordance with a twenty-eighth aspect of the present invention, the bicycle hydraulic quick-release apparatus according to the twenty-seventh aspect is configured so that the housing is configured to be secured to the bicycle frame. The piston is configured to be in contact with the bicycle component to change the relative position between the housing and the piston.

In accordance with a twenty-ninth aspect of the present invention, a bicycle frame comprises a frame body to which a bicycle hub assembly of a wheel is to be attached. The frame body includes an inner cavity, a slit, and an opening. A hub axle of the bicycle hub assembly is to extend through the slit. The opening connects the slit to the inner cavity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
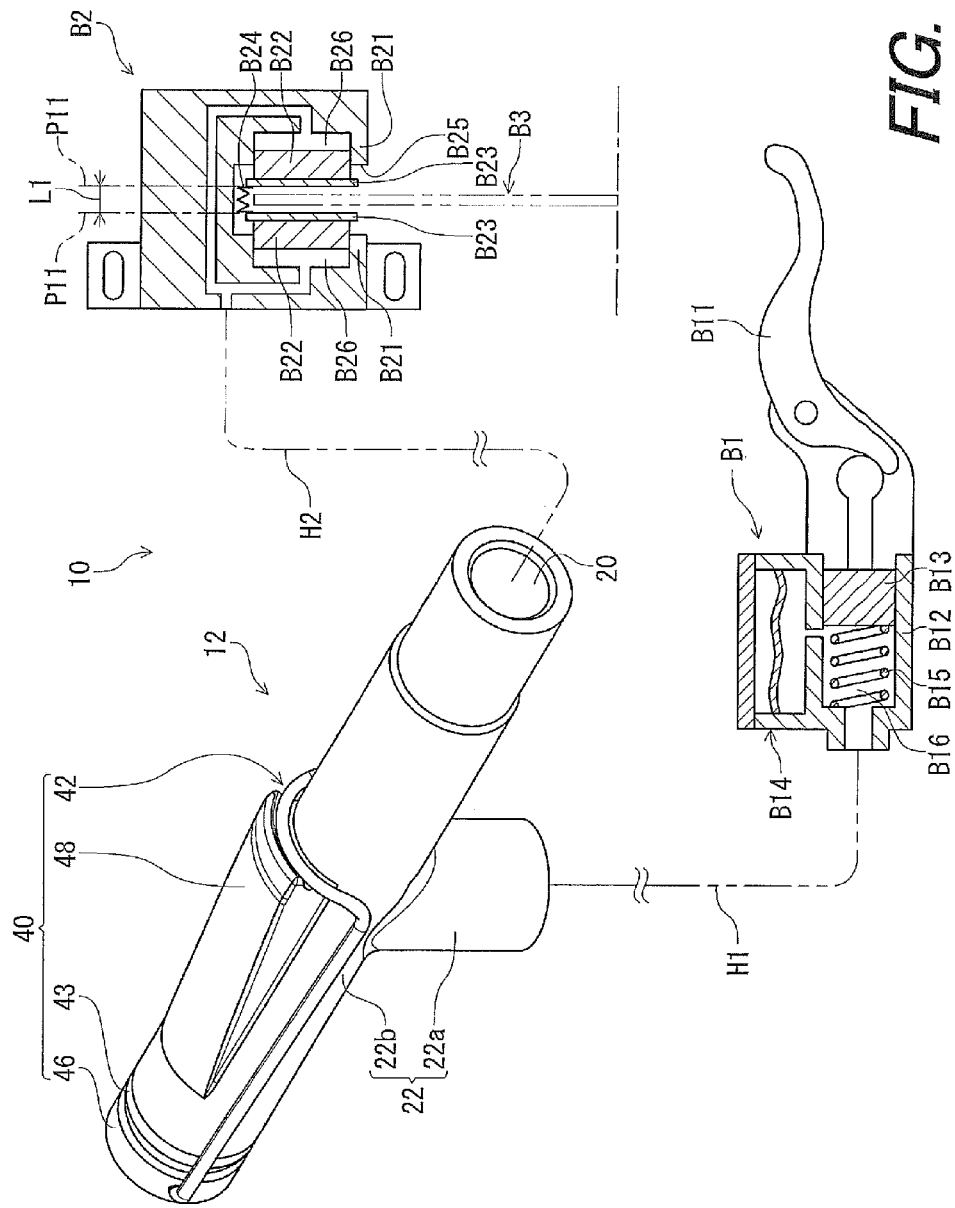
FIG. 1 is a schematic view of a bicycle braking system including a bicycle hydraulic quick-release apparatus in accordance with a first embodiment (first position)

The embodiments will now be described with reference to the accompanying drawings, wherein like reference numerals designate corresponding or identical elements throughout the various drawings.

First Embodiment

Referring initially to FIG. 1, a bicycle braking system 10 includes a brake operating device B1, a brake caliper B2, a disc brake rotor B3, and a bicycle hydraulic quick-release apparatus 12 in accordance with a first embodiment. In the illustrated embodiment, while the bicycle braking system 10 is a disc braking system, possible examples of the bicycle braking system 10 can include the disc braking system or a rim braking system. The bicycle hydraulic quick-release apparatus 12 can be applied to other hydraulic systems such as a suspension system and a height adjustable seatpost.

As seen in FIG. 1, the brake operating device B1 is configured to be operated by a user to supply hydraulic fluid to the brake caliper B2. The brake operating device B1 includes a brake lever B11, a master cylinder B12, a master piston B13, a hydraulic reservoir B14, and a return spring B15. The master piston B13 is movably provided in the master cylinder B12. The master piston B13 is movable relative to the master cylinder B12 in response to operation of the brake lever B11. The master cylinder B12 and the master piston B13 define a master chamber B16. The return spring B15 is disposed in the master chamber B16. The hydraulic reservoir B14 is in fluid communication with the master chamber B16.

The brake caliper B2 is configured to apply a braking force to the disc brake rotor B3 in response to operation of the brake operating device B1. The brake caliper B2 includes a pair of slave cylinders B21, a pair of slave pistons B22, a pair of friction members or brake pads B23, and a spring B24. The slave pistons B22 are movably provided in the slave cylinders B21, respectively. The disc brake rotor B3 is rotatably disposed in a slit B25 of the brake caliper B2 and is provided between the brake pads B23.

As seen in FIG. 1, the slave cylinder B21 and the slave piston B22 define a slave chamber B26. The slave chambers B26 are configured to be in fluid communication with the master chamber B16 of the brake operating device B1 via the bicycle hydraulic quick-release apparatus 12. The hydraulic fluid is supplied from the master chamber B16 to the slave chamber B26 in response to the operation of the brake lever B11. This moves the slave pistons B22 to press the brake pads B23 toward the disc brake rotor B3, causing the brake pads B23 to pinch the disc brake rotor B3 so that the braking force is applied to the disc brake rotor B3 secured to a wheel (not shown).

The bicycle hydraulic quick-release apparatus 12 is configured to switch the brake caliper B2 between a usage state and a maintenance state. The bicycle hydraulic quick-release apparatus 12 is configured to be in fluid communication with the brake operating device B1 and the brake caliper B2. More specifically, the brake operating device B1 is configured to be connected to the bicycle hydraulic quick-release apparatus 12 via a first hydraulic hose H1. The bicycle hydraulic quick-release apparatus 12 is configured to be connected to the brake caliper B2 via a second hydraulic hose H2.

The arrangement of the bicycle hydraulic quick-release apparatus 12 is not limited to the illustrated embodiment. One of the first hydraulic hose H1 and the second hydraulic hose H2 can be omitted from the bicycle braking system 10 if needed and/or desired. For example, the bicycle hydraulic quick-release apparatus 12 can be directly connected to one of the brake operating device B1 and the brake caliper B2. The bicycle hydraulic quick-release apparatus 12 can be integrated in one of the brake operating device B1 and the brake caliper B2 if needed and/or desired.

Figure 2:
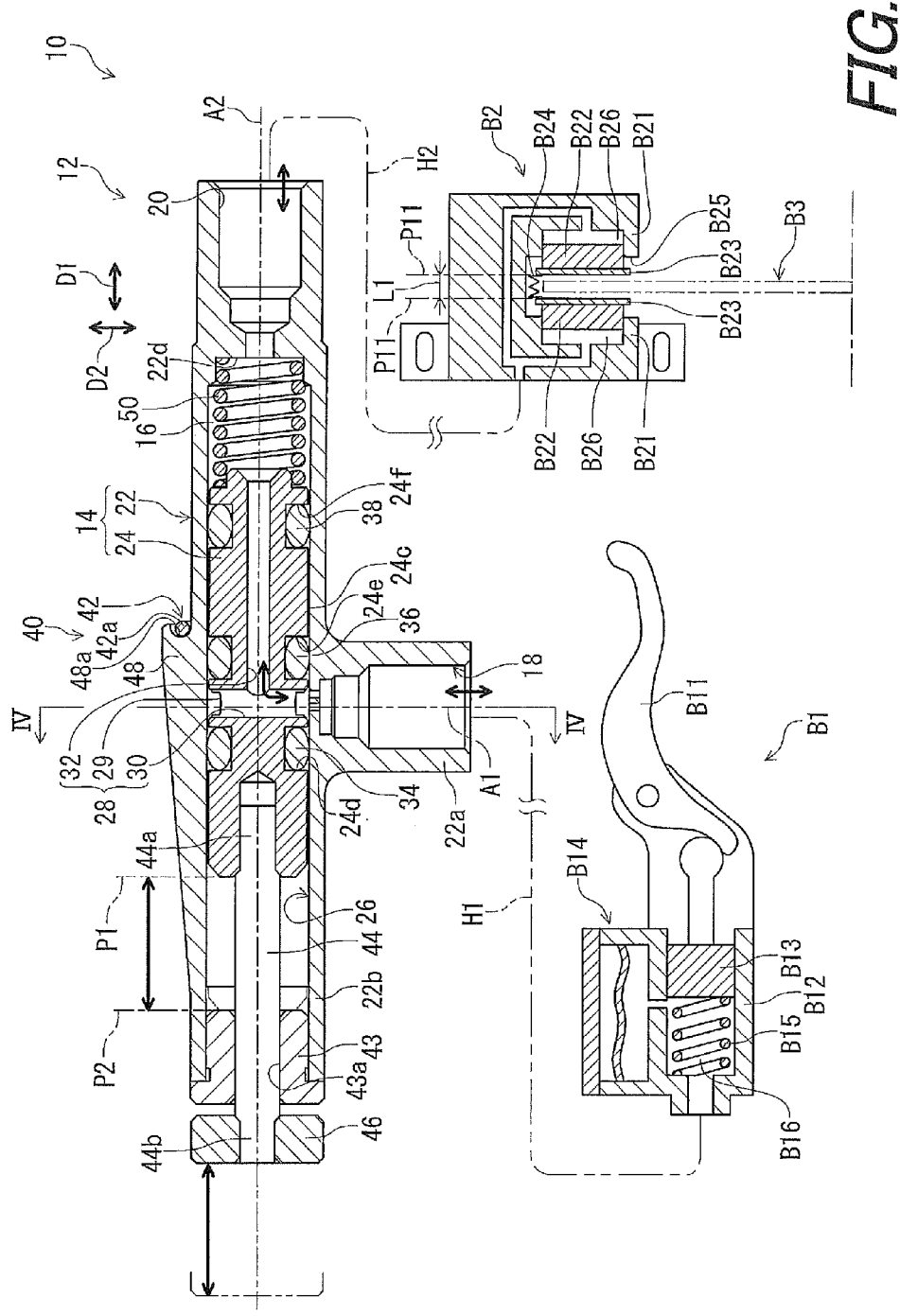
FIG. 2 is a cross-sectional view of the bicycle braking system including the bicycle hydraulic quick-release apparatus illustrated in FIG. 1 (first position)

As seen in FIG. 2, the bicycle hydraulic quick-release apparatus 12 comprises a main body 14 and a hydraulic chamber 16. The main body 14 includes a first hole 18 and a second hole 20. The hydraulic chamber 16 is provided between the first hole 18 and the second hole 20. In the illustrated embodiment, the first hole 18 is configured to be connected to the master chamber B16 of the brake operating device B1 via the first hydraulic hose H1. The second hole 20 is configured to be connected to the slave chambers B26 of the brake caliper B2 via the second hydraulic hose H2.

Figure 3:
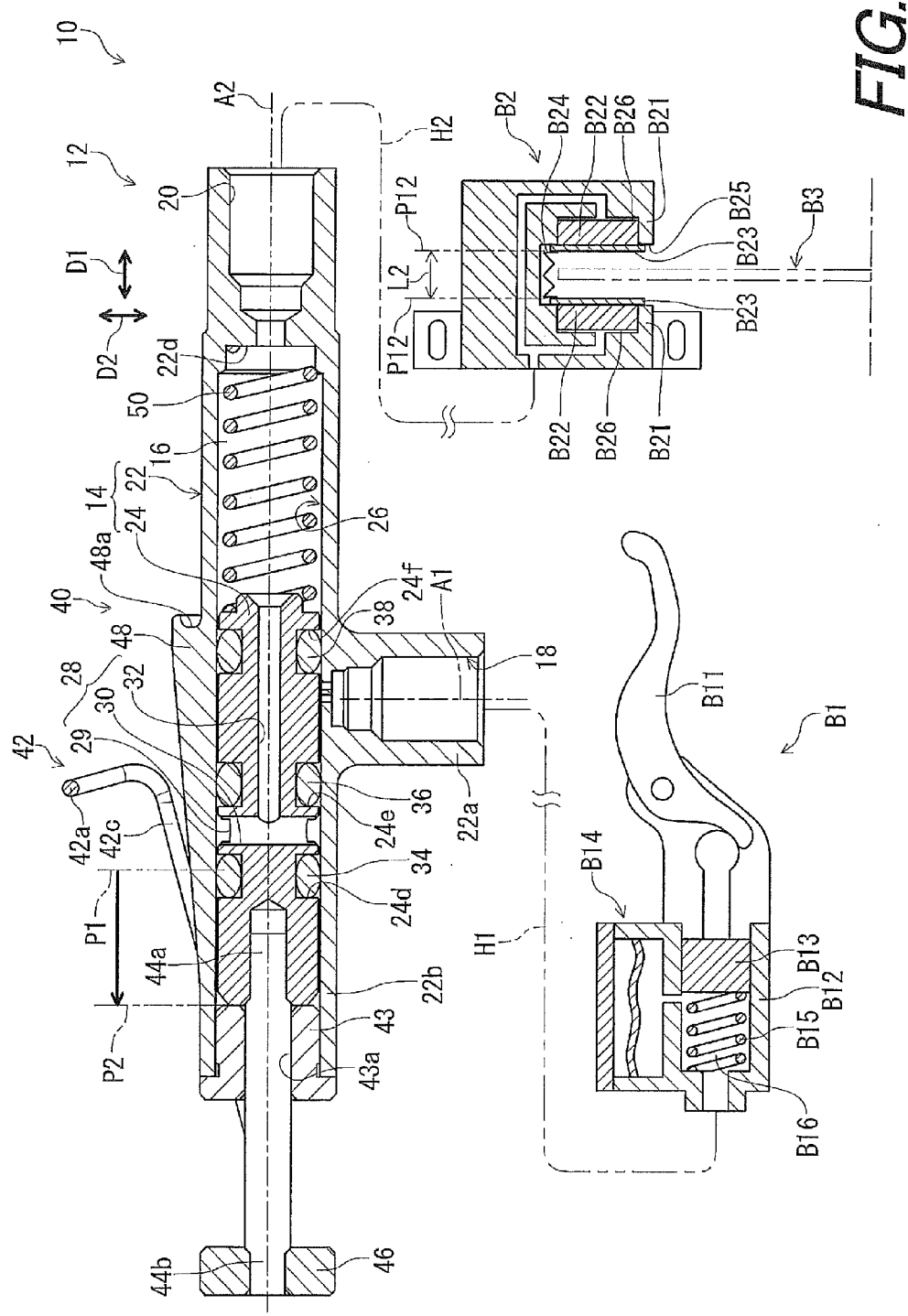
FIG. 3 is a cross-sectional view of the bicycle braking system including the bicycle hydraulic quick-release apparatus illustrated in FIG. 1 (second position)

As seen in FIGS. 2 and 3, the hydraulic chamber 16 has a changeable volume. As seen in FIG. 2, the hydraulic chamber 16 is configured to be in a first chamber state where a volume of the hydraulic chamber 16 is a first volume. In the illustrated embodiment, the hydraulic chamber 16 is connected to the first hole 18 and the second hole 20 in the first chamber state. As seen in FIG. 3, the hydraulic chamber 16 is configured to be in a second chamber state where the volume of the hydraulic chamber 16 is a second volume different from the first volume. In the illustrated embodiment, the hydraulic chamber 16 is disconnected from the first hole 18 in the second chamber state. As seen in FIGS. 2 and 3, the second volume is greater than the first volume.

As seen in FIG. 2, in the first chamber state of the hydraulic chamber 16, when the brake lever B11 is in a rest position, each of the brake pads B23 is positioned at an initial position P11 relative to the slave cylinders B21. In this usage state of the brake caliper B2, the brake pads B23 are spaced apart from each other by a distance L1.

As seen in FIG. 3, in the second chamber state of the hydraulic chamber 16, the brake pads B23 are positioned at released positions P12 relative to the slave cylinders B21, respectively, regardless of the operation of the brake lever B11. In this maintenance state of the brake caliper B2, the brake pads B23 are spaced apart from each other by a distance L2 longer than the distance L1. Switching the brake caliper B2 from the usage state to the maintenance state increases a distance between the brake pads B23, allowing a user to easily detach and attach the wheel with the disc brake rotor B3 from and to a bicycle frame (not shown).

As seen in FIG. 2, the main body 14 includes a housing 22 and a piston 24. The hydraulic chamber 16 is defined by the housing 22 and the piston 24. The first hole 18 and the second hole 20 are provided at the housing 22. The housing 22 includes a cylinder bore 26. The piston 24 is movably provided in the cylinder bore 26.

The housing 22 includes a first portion 22a and a second portion 22b. The first portion 22a has a substantially cylindrical shape and at least partially defines the first hole 18. The second portion 22b has a substantially cylindrical shape and at least partially defines the cylinder bore 26 and the second hole 20. The first portion 22a has a first center axis A1. The second portion 22b has a second center axis A2 extending in an axial direction D1 of the second portion. The first center axis A1 of the first portion 22a is parallel to a radial direction D2 of the second portion 22b. The first portion 22a extends from the second portion 22b in the radial direction D2 which is perpendicular to the axial direction D1 and the second center axis A2.

The cylinder bore 26 extends in the axial direction D1. The piston 24 is movable relative to the housing 22 between a first position P1 and a second position P2 in the axial direction D1. The hydraulic chamber 16 is provided between the piston 24 and the second hole 20 in the axial direction D1. In the illustrated embodiment, the first position P1 and the second position P2 are defined based on an end surface of the piston 24.

As seen in FIGS. 2 and 3, the main body 14 is configured so as to switch the hydraulic chamber 16 between the first chamber state and the second chamber state in accordance with a relative position between the housing 22 and the piston 24. As seen in FIG. 2, the piston 24 is disposed at the first position P1 relative to the housing 22 in the first chamber state of the hydraulic chamber 16. As seen in FIG. 3, the piston 24 is disposed at the second position P2 relative to the housing 22 in the second chamber state of the hydraulic chamber 16.

As seen in FIG. 2, the piston 24 includes a fluid passageway 28. The fluid passageway 28 is connected to the first hole 18 in a state where the piston 24 is disposed at the first position P1. As seen in FIG. 3, the fluid passageway 28 is disconnected from the first hole 18 in a state where the piston 24 is disposed at the second position P2. As seen in FIGS. 2 and 3, the fluid passageway 28 is connected to the hydraulic chamber 16 and the second hole 20 in the state where the piston 24 is disposed at each of the first position P1 and the second position P2.

Figure 4:
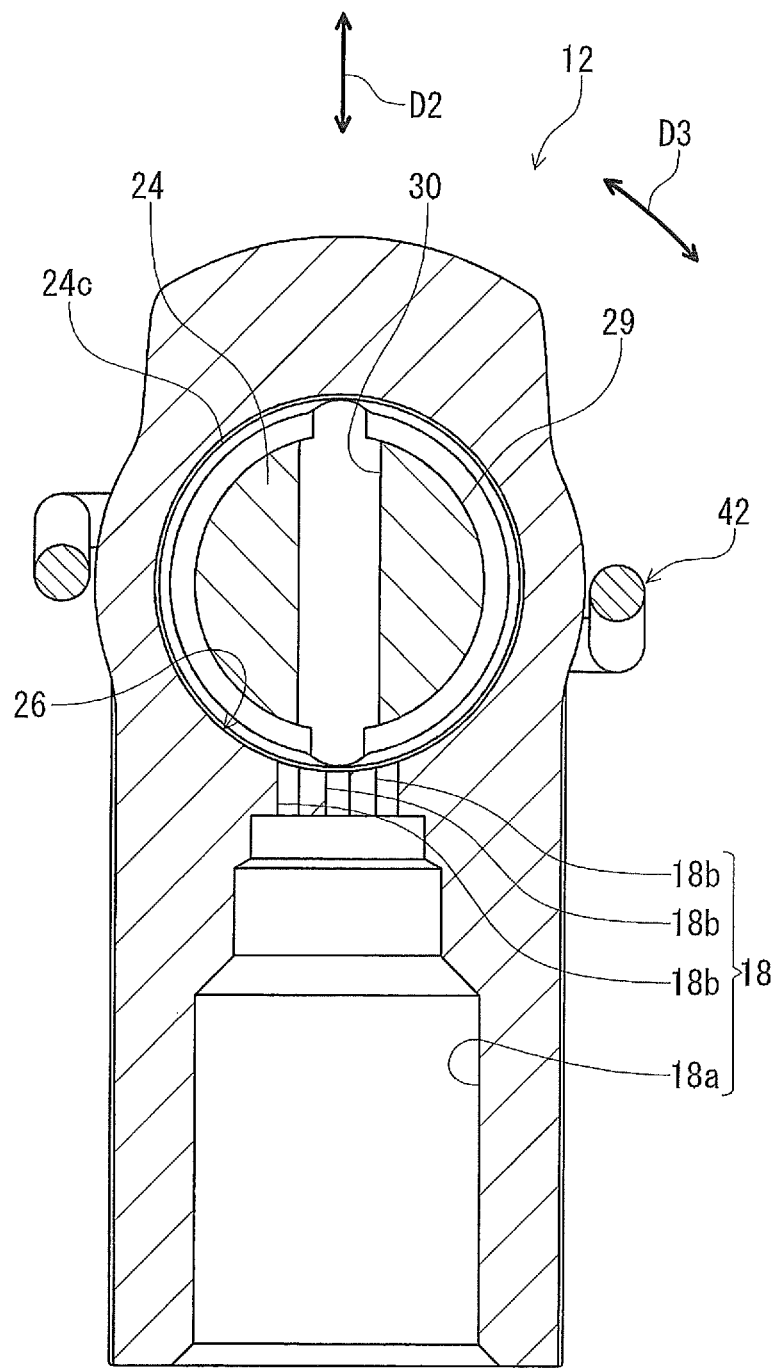
FIG. 4 is a cross-sectional view of the bicycle hydraulic quick-release apparatus taken along line IV-IV of FIG. 2.

As seen in FIG. 2, the fluid passageway 28 includes a first passageway 29, a second passageway 30, and a third passageway 32. As seen in FIG. 4, the first passageway 29 has an annular shape and extends in a circumferential direction D3 of the piston 24. The first passageway 29 is provided on an outer peripheral surface 24c of the piston 24. The second passageway 30 extends in the radial direction D2. Both ends of the second passageway 30 are connected to the first passageway 29.

As seen in FIG. 2, the first passageway 29 is connected to the first hole 18 in the state where the piston 24 is disposed at the first position P1. As seen in FIG. 3, the first passageway 29 is disconnected from the first hole 18 in the state where the piston 24 is disposed at the second position P2.

The third passageway 32 extends in the axial direction D1 from the second passageway 30 toward the hydraulic chamber 16. The third passageway 32 is connected to each of the second passageway 30 and the hydraulic chamber 16.

As seen in FIG. 2, the piston 24 includes a first groove 24d, a second groove 24e, and a third groove 24f. The first groove 24d has an annular shape and is provided on the outer peripheral surface 24c of the piston 24. The second groove 24e has an annular shape and is provided on the outer peripheral surface 24c of the piston 24. The third groove 24f has an annular shape and is provided on the outer peripheral surface 24c of the piston 24.

As seen in FIG. 2, the bicycle hydraulic quick-release apparatus 12 further comprises a first seal member 34, a second seal member 36, and a third seal member 38. The first seal member 34 has an annular shape and is provided in the first groove 24d. The second seal member 36 has an annular shape and is provided in the second groove 24e. The third seal member 38 has an annular shape and is provided in the third groove 24f. Each of the first seal member 34, the second seal member 36, and the third seal member 38 is slidably in contact with an inner peripheral surface of the second portion 22b of the housing 22.

As seen in FIG. 2, the second seal member 36 is provided between the first seal member 34 and the third seal member 38 in the axial direction D1. The second passageway 30 is provided between the first seal member 34 and the second seal member 36 in the axial direction D1. The third seal member 38 is closer to the hydraulic chamber 16 than the first seal member 34 and the second seal member 36.

Figure 5:
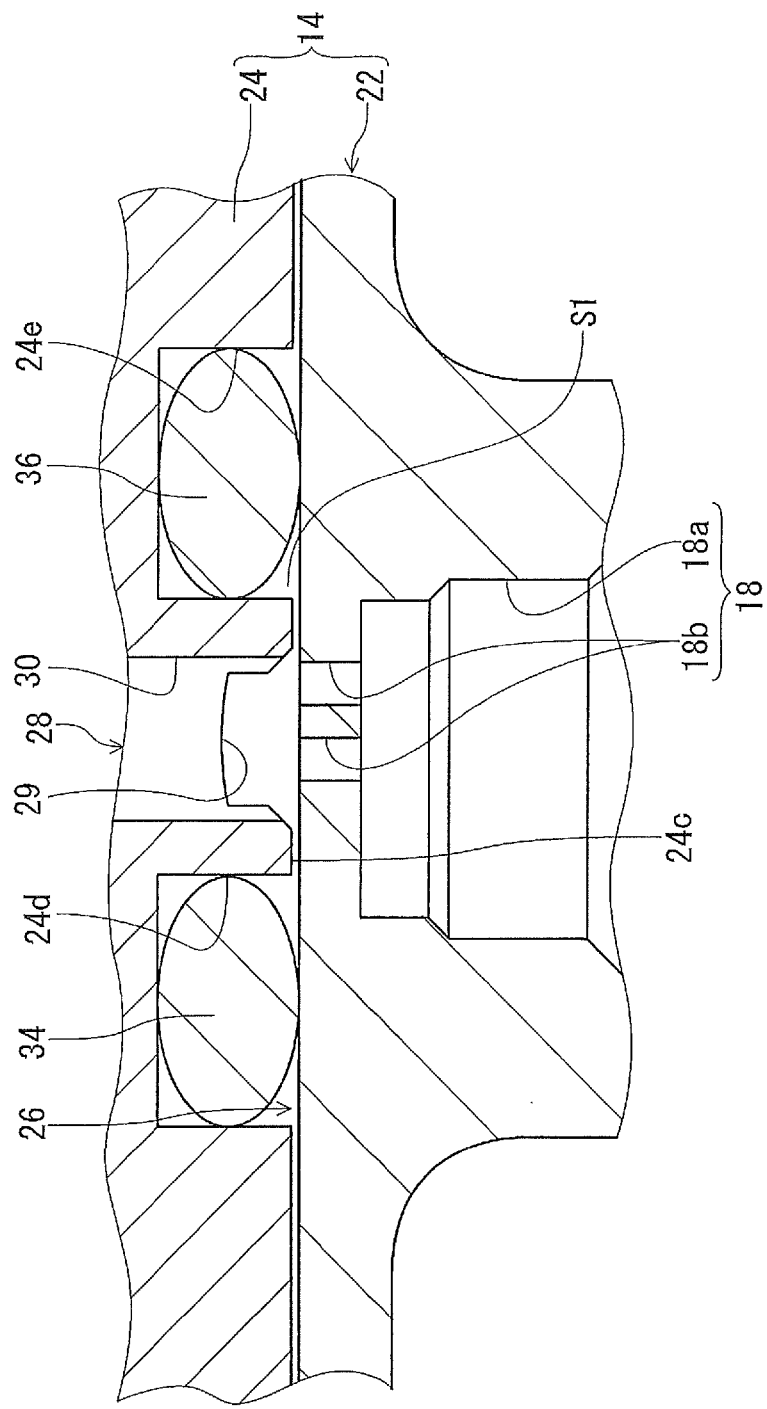
FIG. 5 is an enlarged partial cross-sectional view of the bicycle hydraulic quick-release apparatus illustrated in FIG. 2.

As seen in FIGS. 4 and 5, the first hole 18 includes a stepped hole 18a and connecting holes 18b. The connecting holes 18b are configured to connect the stepped hole 18a to the cylinder bore 26 of the second portion 22b. As seen in FIG. 5, the connecting holes 18b are disposed between the first seal member 34 and the second seal member 36 in the axial direction D1 in the state where the piston 24 is disposed at the first position P1 (FIG. 2). The connecting holes 18b are disposed radially outward of the first passageway 29 in the state where the piston 24 is disposed at the first position P1 (FIG. 2).

As seen in FIG. 5, a first space S1 is defined by the first seal member 34, the second seal member 36, the piston 24, and the inner peripheral surface of the housing 22 (the second portion 22b). The connecting holes 18b of the first hole 18 are connected to the fluid passageway 28 via the first space S1 in the state where the piston 24 is disposed at the first position P1 (FIG. 2).

Figure 6:
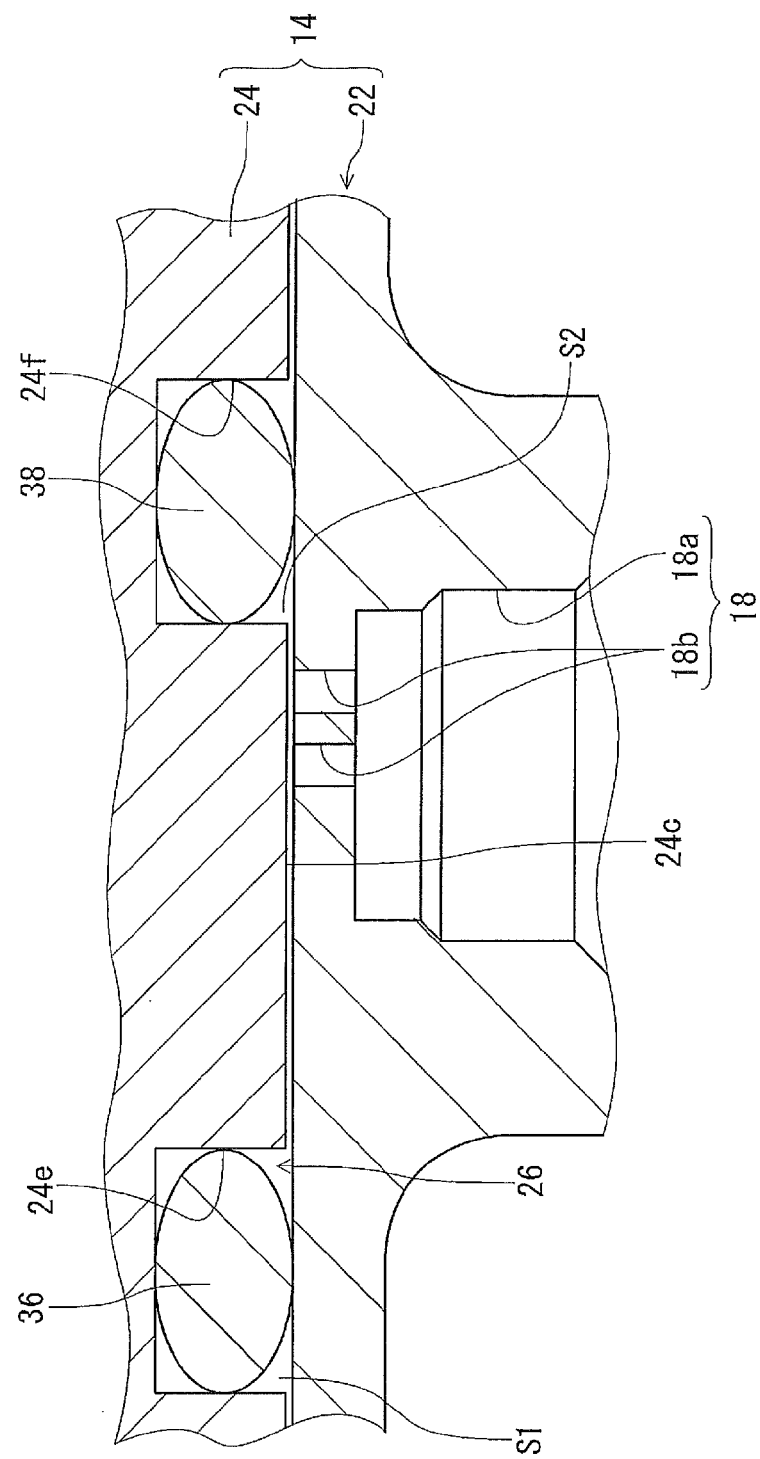
FIG. 6 is an enlarged partial cross-sectional view of the bicycle hydraulic quick-release apparatus illustrated in FIG. 3.

As seen in FIG. 6, the connecting holes 18b are disposed between the second seal member 36 and the third seal member 38 in the axial direction D1 in the state where the piston 24 is disposed at the second position P2 (FIG. 3). The connecting holes 18b are disposed to face the outer peripheral surface 24c of the piston 24 in the state where the piston 24 is disposed at the second position P2 (FIG. 3).

A second space S2 is defined by the second seal member 36, the third seal member 38, the piston 24, and the inner peripheral surface of the housing 22 (the second portion 22b). The second space S2 is disconnected from the fluid passageway 28 in the state where the piston 24 is disposed at the second position P2 (FIG. 3). Namely, the connecting holes 18b of the first hole 18 are disconnected from the fluid passageway 28 in the state where the piston 24 is disposed at the second position P2 (FIG. 3).

As seen in FIG. 1, the bicycle hydraulic quick-release apparatus 12 further comprises a positioning structure 40 configured to adjustably position the piston 24 relative to the housing 22. As seen in FIG. 2, the positioning structure 40 is configured to position the piston 24 at the first position P1 so that the hydraulic chamber 16 is in the first chamber state. As seen in FIG. 3, the positioning structure 40 is configured to position the piston 24 at the second position P2 so that the hydraulic chamber 16 is in the second chamber state.

Figure 7:
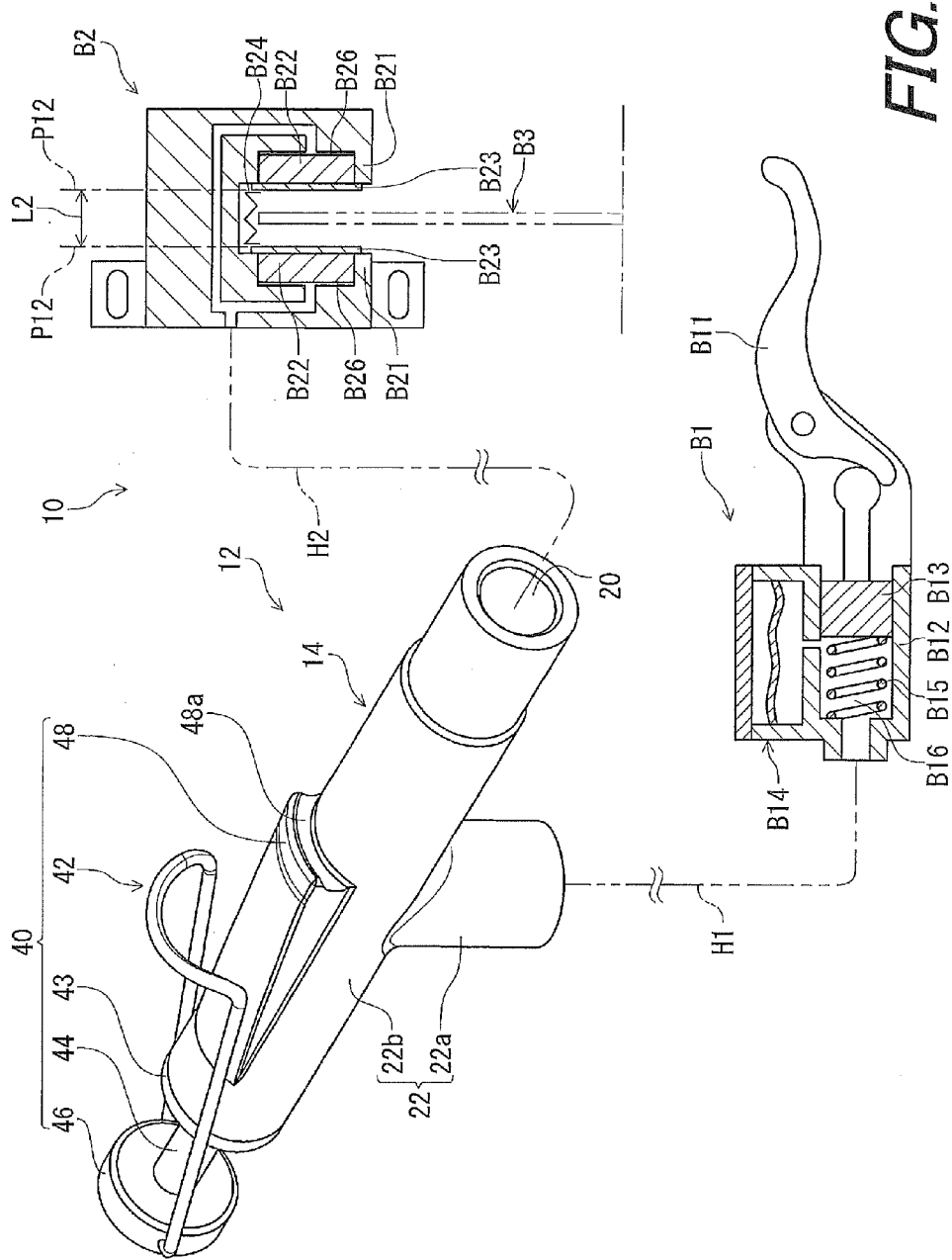
FIG. 7 is a schematic view of the bicycle braking system including the bicycle hydraulic quick-release apparatus in accordance with the first embodiment (second position)

As seen in FIGS. 1 and 7, the positioning structure 40 includes a coupling member 42 configured to couple the piston 24 to the housing 22 so that the piston 24 is positioned on at least one of the first position P1 and the second position P2. In the illustrated embodiment, the coupling member 42 is configured to couple the piston 24 to the housing 22 so that the piston 24 is positioned at the first position P1. However, the coupling member 42 can be configured to couple the piston 24 to the housing 22 so that the piston 24 is positioned at each of the first position P1 and the second position P2 if needed and/or desired.

As seen in FIGS. 1 and 7, the positioning structure 40 includes a cap 43, a connecting rod 44, and a flange 46. The cap 43 is secured to the housing 22 of the main body 14. The flange 46 is secured to the connecting rod 44 and is disposed outside the housing 22.

As seen in FIG. 2, the connecting rod 44 is secured to the piston 24. The connecting rod 44 includes a first end portion 44a and a second end portion 44b opposite to the first end portion 44a in the axial direction D1. In the illustrated embodiment, the first end portion 44a is secured to the piston 24. The flange 46 is secured to the second end portion 44b. The cap 43 includes a through-hole 43a extending in the axial direction D1. The connecting rod 44 extends through the through-hole 43a to be movable relative to the cap 43 and the housing 22.

Figure 8:
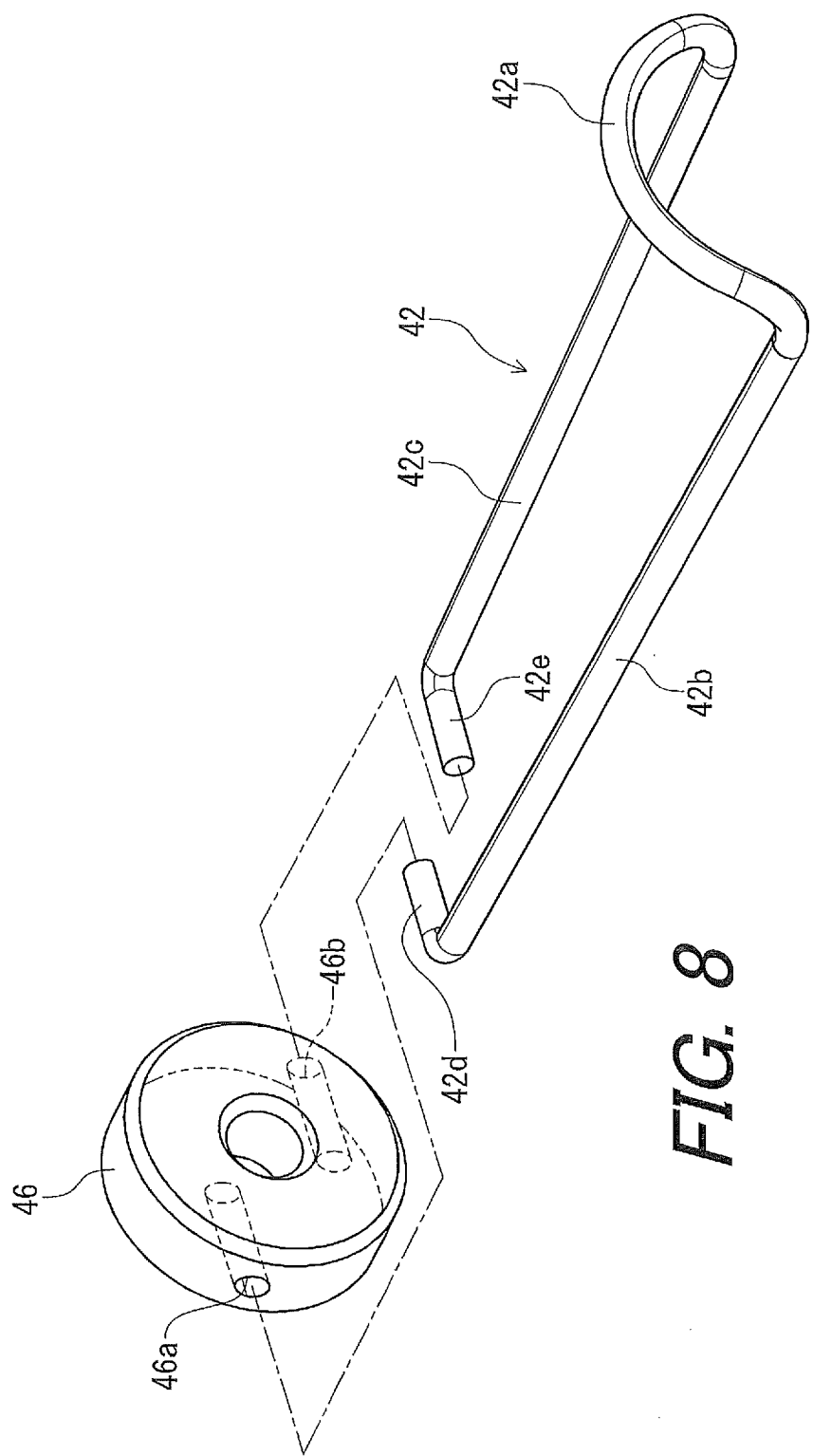
FIG. 8 is an exploded perspective view of a coupling member and a flange of the bicycle hydraulic quick-release apparatus illustrated in FIG. 7.

As seen in FIG. 8, the coupling member 42 is a bended wire and is pivotably attached to the flange 46. The coupling member 42 includes an engaging part 42a, a first extending part 42b, a second extending part 42c, a first pivot part 42d, and a second pivot part 42e. The engaging part 42a has a curved shape. The first extending part 42b extends from an end of the engaging part 42a. The second extending part 42c extends from the other end of the engaging part 42a. The first pivot part 42d is provided at an end of the first extending part 42b and extends from the first extending part 42b toward the second pivot part 42e. The second pivot part 42e is provided at an end of the second extending part 42c and extends from the second extending part 42c toward the first pivot part 42d.

The flange 46 includes a first pivot hole 46a and a second pivot hole 46b. The first pivot part 42d is pivotably provided in the first pivot hole 46a. The second pivot part 42e is pivotably provided in the second pivot hole 46b. In the illustrated embodiment, the first pivot hole 46a is offset from the second pivot hole 46b. The first pivot part 42d is offset from the second pivot part 42e.

As seen in FIG. 7, the positioning structure 40 includes a stopper 48 configured to engage with the engaging part 42a of the coupling member 42. In the illustrated embodiment, the stopper 48 is configured to engage with the coupling member 42 (the engaging part 42a) to position the piston 24 at the first position P1 (FIGS. 1 and 2). The stopper 48 is provided on the housing 22 of the main body 14. While the stopper 48 is integrally provided with the housing 22 as a single unitary member in the illustrated embodiment, the stopper 48 can be a separate member from the housing 22 if needed and/or desired.

As seen in FIG. 7, the stopper 48 includes an engagement groove 48a having a curved shape corresponding to the engaging part 42a of the coupling member 42. The engaging part 42a is fitted in the engagement groove 48a to position the piston 24 at the first position P1 (FIGS. 1 and 2).

As seen in FIG. 2, the piston 24 is positioned at the first position P1 in a state where the engaging part 42a of the coupling member 42 engages with the engagement groove 48a of the stopper 48. The piston 24 is spaced apart from the cap 43 as the piston 24 is positioned at the first position P1 by the positioning structure 40.

As seen in FIG. 3, the piston 24 is positioned at the second position P2 in a state where the engaging part 42a of the coupling member 42 disengages from the engagement groove 48a of the stopper 48. The piston 24 is contactable with the cap 43. The piston 24 contacts the cap 43 as the piston 24 is positioned at the second position P2 by the positioning structure 40. In other words, the cap 43 is configured to position the piston 24 at the second position P2.

As seen in FIG. 2, the positioning structure 40 includes a biasing member 50 configured to bias the piston 24 toward the second position P2. While the biasing member 50 is provided in the hydraulic chamber 16 in the illustrated embodiment, the biasing member 50 can be provided at positions other than the inside of the hydraulic chamber 16 if needed and/or desired.

For example, the biasing member 50 is a spring. The biasing member 50 is compressed between the piston 24 and an inner end surface 22d of the housing 22 (the second portion 22b). The biasing member 50 biases the piston 24 toward the second position P2. The biasing member 50 is not limited to the spring.

As seen in FIG. 2, the coupling member 42 is configured to couple the piston 24 to the housing 22 so that the piston 24 is positioned on at least one of the first position P1 and the second position P2 against a biasing force from the biasing member 50. In the illustrated embodiment, the coupling member 42 is configured to couple the piston 24 to the housing 22 so that the piston 24 is positioned at the first position P1 against the biasing force from the biasing member 50. As seen in FIG. 3, the cap 43 is configured to position the piston 24 at the second position P2 against the biasing force from the biasing member 50.

While the positioning structure 40 includes the biasing member 50 in the illustrated embodiment, the biasing member 50 can be omitted from the bicycle hydraulic quick-release apparatus 12 if needed and/or desired. In such an embodiment, the flange 46 is pulled by a user to move the piston to the second position P2.

The operation of the bicycle hydraulic quick-release apparatus 12 will be described in detail below referring to FIGS. 1 to 3 and 7. As seen in FIGS. 1 to 3, when the coupling member 42 is disengaged from the stopper 48 by a user in the first chamber state of the hydraulic chamber 16, the biasing force of the biasing member 50 moves the piston 24 from the first position P1 to the second position P2. This increases the volume of the hydraulic chamber 16 from the first volume (FIG. 2) to the second volume (FIG. 3). Thus, the brake caliper B2 changes from the usage state (FIG. 2) to the maintenance state (FIG. 3), allowing the user to replace the wheel into a new wheel (not shown).

After the wheel is replaced into the new wheel in the maintenance state of the brake caliper B2, the flange 46 is pressed against the biasing force of the biasing member 50 by the user so that the piston 24 is moved from the second position P2 to the first position P1. This decreases the volume of the hydraulic chamber 16 from the second volume (FIG. 3) to the first volume (FIG. 2). The coupling member 42 is engaged with the stopper 48 by the user in the state where the piston 24 is held around the first position P1 via the flange 46 and the connecting rod 44, causing the piston 24 to be positioned at the first position P1. Thus, the brake caliper B2 changes from the maintenance state (FIG. 3) to the usage state (FIG. 2).

With the bicycle hydraulic quick-release apparatus 12, the hydraulic chamber 16 is configured to be in the first chamber state (FIG. 2) where the volume of the hydraulic chamber 16 is the first volume. The hydraulic chamber 16 is configured to be in the second chamber state (FIG. 3) where the volume of the hydraulic chamber 16 is the second volume different from the first volume.

In a case where the hydraulic chamber 16 is connected to the brake caliper B2, for example, changing the hydraulic chamber 16 between the first chamber state and the second chamber state switches the brake caliper B2 between the usage state (FIG. 2) and the maintenance state (FIG. 3). Accordingly, it is possible to quickly switch the brake caliper B2 between the usage state and the maintenance state.

Furthermore, since the hydraulic chamber 16 is disconnected from the first hole 18 in the second chamber state, the bicycle hydraulic quick-release apparatus 12 can prevent incorrect operation from being transmitted from the brake operating device B1 to the brake caliper B2 in the maintenance state. Additionally, the disconnection between the hydraulic chamber 16 and the first hole 18 allows the brake caliper B2 to be switched between the usage state and the maintenance state even in an open-type hydraulic system where the brake operating device B1 includes the hydraulic reservoir B14.

Second Embodiment

Figure 9:
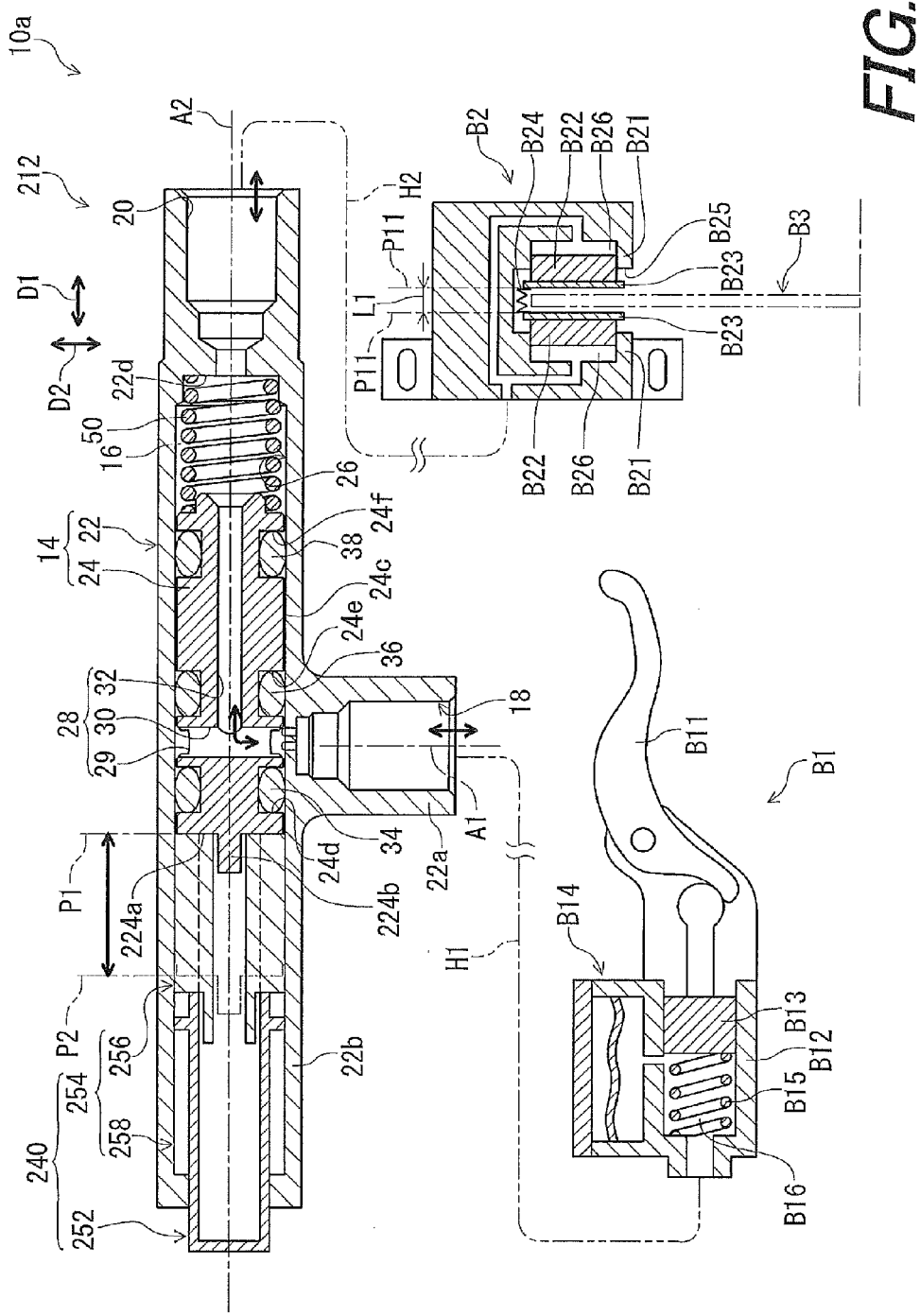
FIG. 9 is a cross-sectional view of a bicycle braking system including a bicycle hydraulic quick-release apparatus in accordance with a second embodiment (first position)
Figure 10:
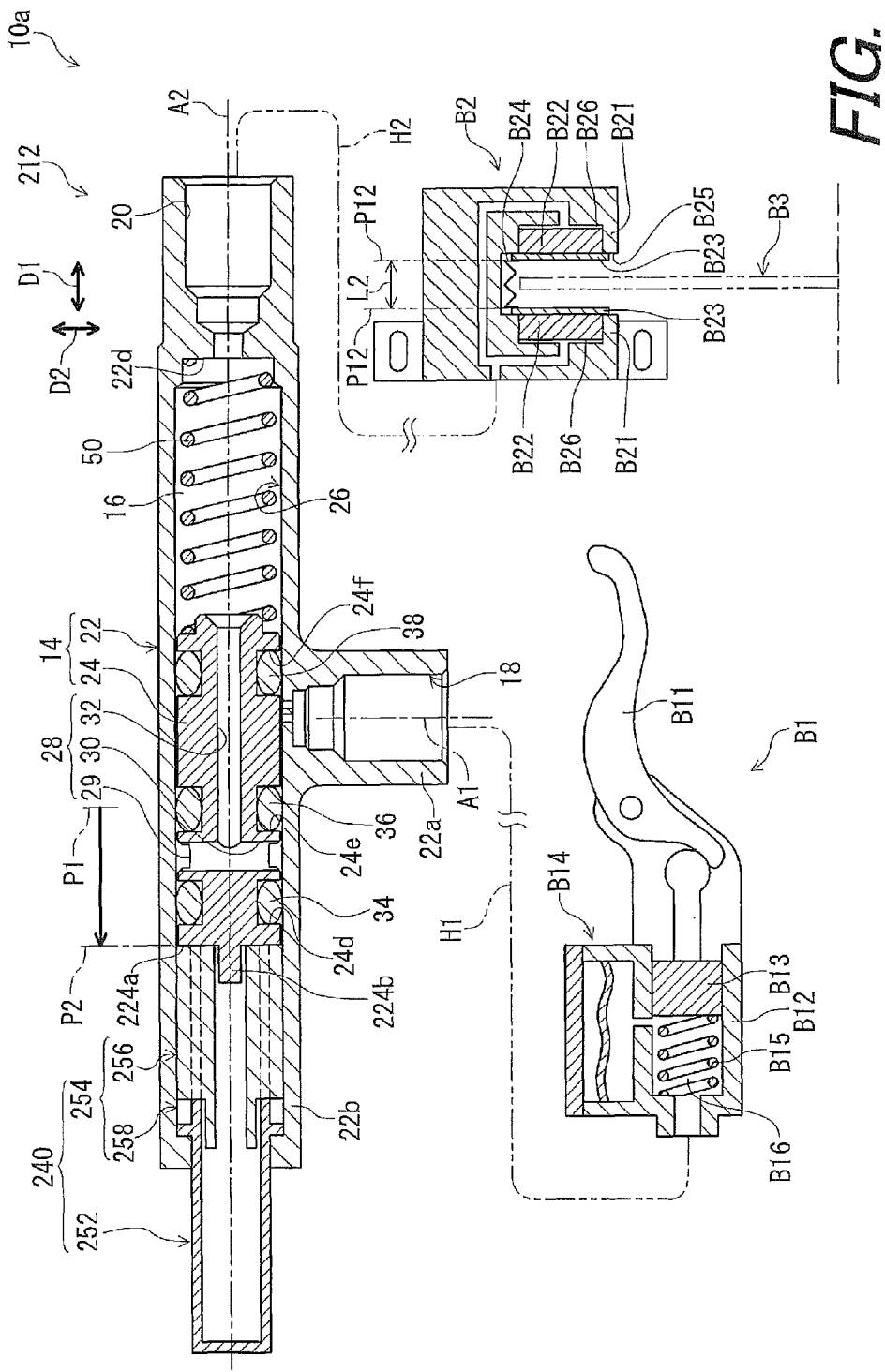
FIG. 10 is a cross-sectional view of the bicycle braking system including the bicycle hydraulic quick-release apparatus illustrated in FIG. 9 (second position)

Referring to FIGS. 9 and 10, a bicycle braking system 10a includes a bicycle hydraulic quick-release apparatus 212 in accordance with a second embodiment. The bicycle hydraulic quick-release apparatus 212 will be described below referring to FIGS. 9 to 23. The bicycle hydraulic quick-release apparatus 212 has the same configuration as the bicycle hydraulic quick-release apparatus 12 except for the positioning structure. Thus, elements having substantially the same function as those in the first embodiment will be numbered the same here, and will not be described and/or illustrated again in detail here for the sake of brevity.

As seen in FIG. 9, the bicycle hydraulic quick-release apparatus 212 further comprises a positioning structure 240 instead of the positioning structure 40 in accordance with the first embodiment. The positioning structure 240 is configured to adjustably position the piston 24 relative to the housing 22. Unlike the positioning structure 40, the positioning structure 240 includes an operating member 252 and a knock mechanism 254.

As seen in FIGS. 9 and 10, the operating member 252 is movable relative to the housing 22 in the axial direction D1 in which the piston 24 is movable relative to the housing 22. The knock mechanism 254 is configured to switch a position of the piston 24 between the first position P1 and the second position P2 in response to axial movement of the operating member 252.

As seen in FIG. 9, the knock mechanism 254 includes a rotatable member 256 and a cam member 258. The rotatable member 256 is provided between the piston 24 and the operating member 252 in the axial direction D1. The rotatable member 256 is provided in the cylinder bore 26 and is rotatable relative to the piston 24, the housing 22, and the operating member 252. The piston 24 includes a supporting surface 224a and a supporting rod 224b protruding from the supporting surface 224a. The rotatable member 256 is slidable with the supporting surface 224a.

As seen in FIGS. 9 and 10, the cam member 258 is configured to position the piston 24 via the rotatable member 256 at each of the first position P1 and the second position P2. The cam member 258 is provided on the inner peripheral surface of the housing 22 (the second portion 22b). In the illustrated embodiment, the cam member 258 is integrally provided with the housing 22 as a single unitary member.

Figure 11:
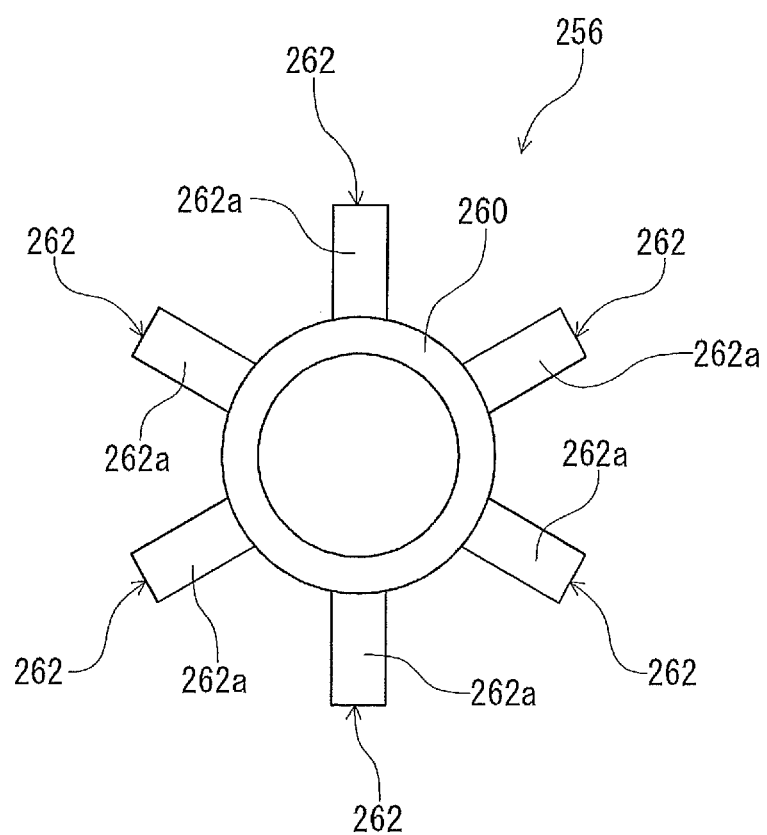
FIG. 11 is a rear view of a rotatable member provided in the bicycle hydraulic quick-release apparatus illustrated in FIG. 9.
Figure 12:
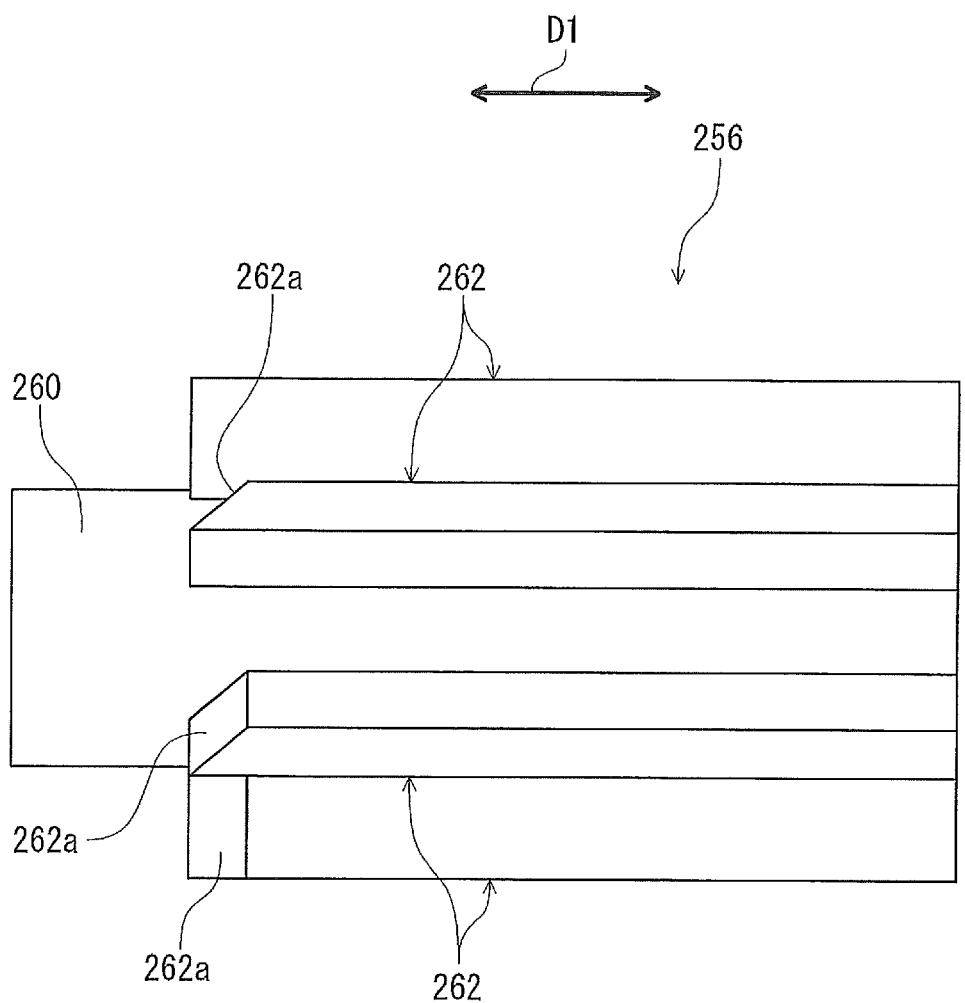
FIG. 12 is a side elevational view of the rotatable member illustrated in FIG. 11.
Figure 13:
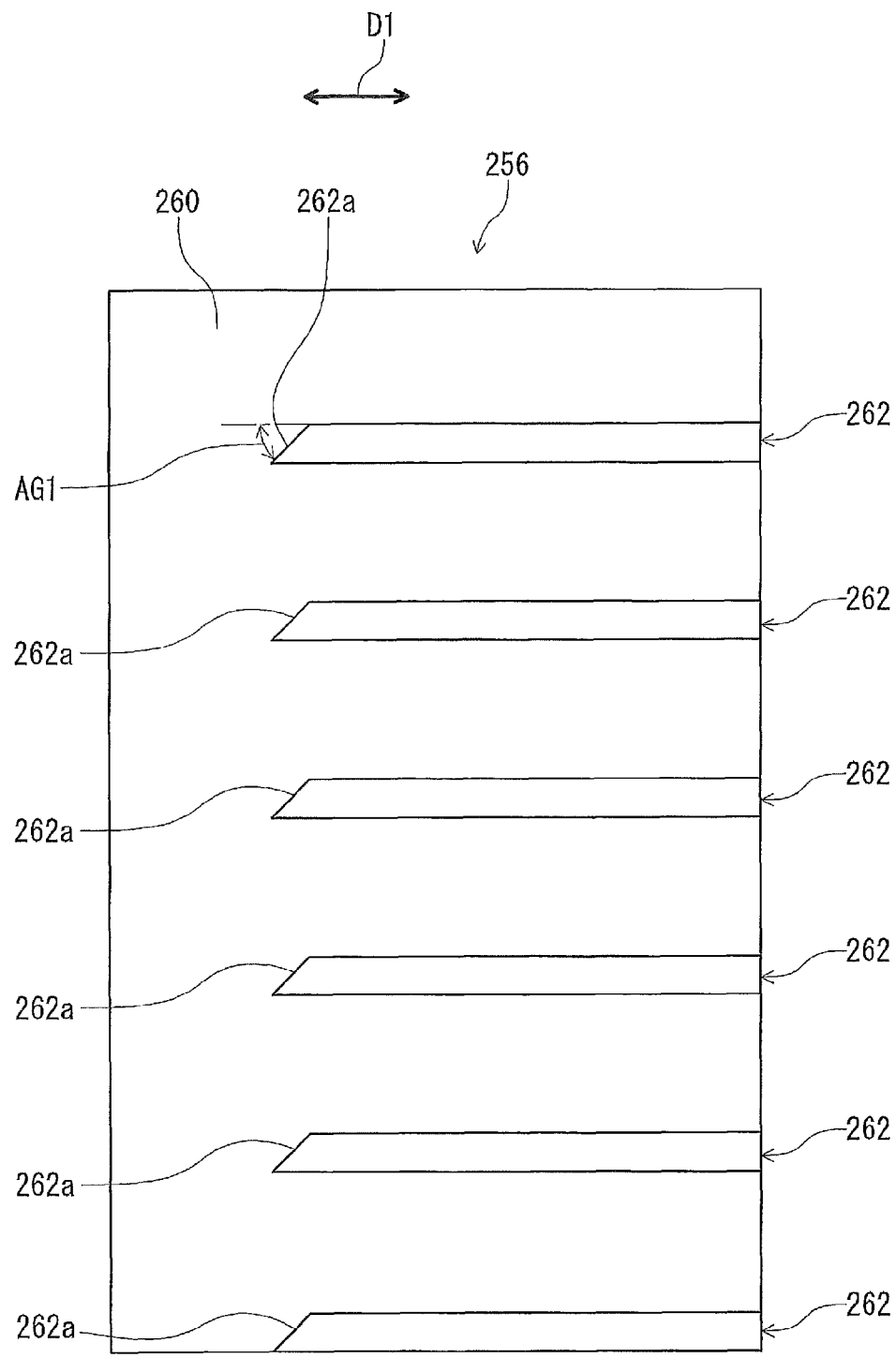
FIG. 13 is a development view of the rotatable member illustrated in FIG. 11 when viewed from a radially outer side of the rotatable member.

As seen in FIGS. 11 to 13, the rotatable member 256 includes a tubular part 260 and cam followers 262. The supporting rod 224b of the piston 24 is provided in the tubular part 260 (FIGS. 9 and 10). The cam followers 262 are provided on an outer peripheral surface of the tubular part 260 and protrudes radially outward from the tubular part 260. In the illustrated embodiment, the cam followers 262 are integrally with the tubular part 260 as a single unitary member. The cam followers 262 have the same shape as each other and are circumferentially arranged.

As seen in FIGS. 11 to 13, each of the cam followers 262 has a sliding surface 262a. As seen in FIG. 13, the sliding surface 262a is inclined relative to the axial direction D1 at an inclination angle AG1 and is substantially parallel to a radial direction of the rotatable member 256 (a direction perpendicular to a paper surface of FIG. 13).

Figure 14:
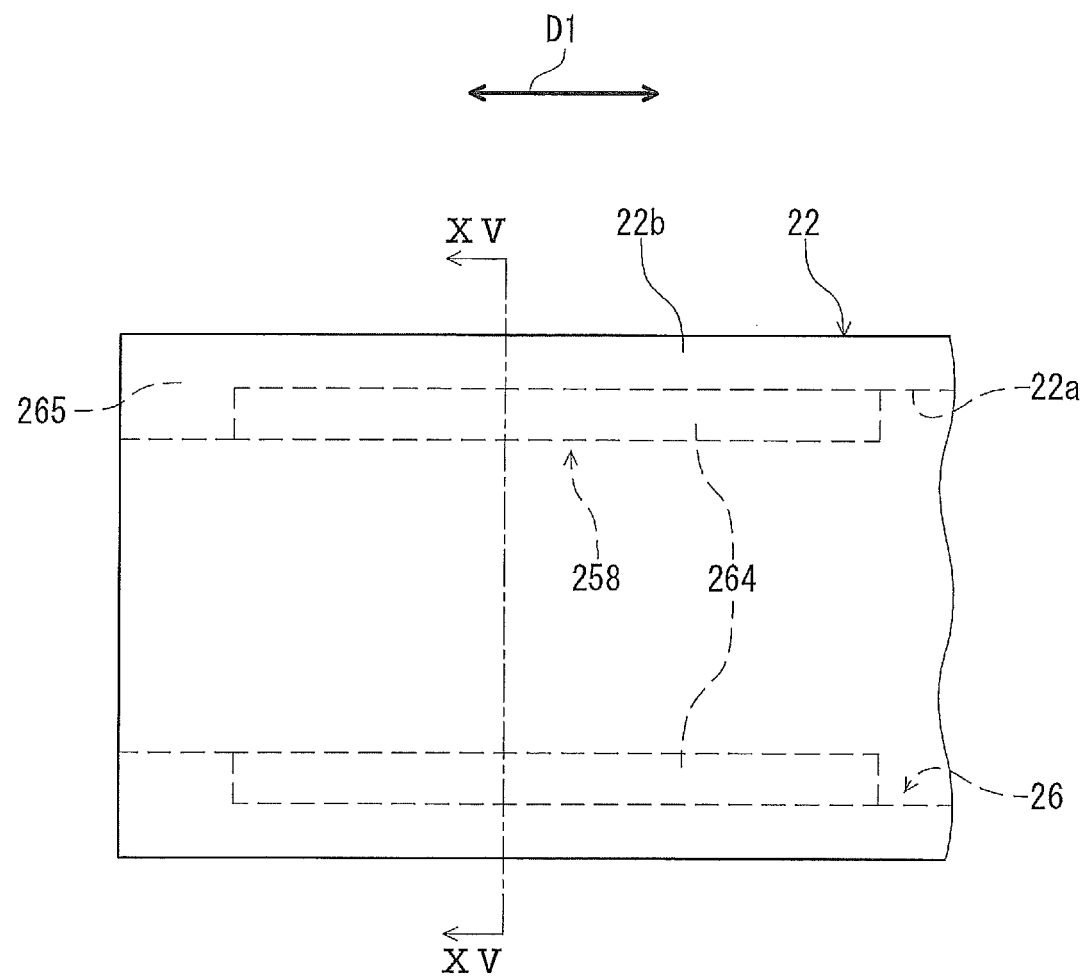
FIG. 14 is a side elevational view of a cam member provided in the bicycle hydraulic quick-release apparatus illustrated in FIG. 9.
Figure 15:
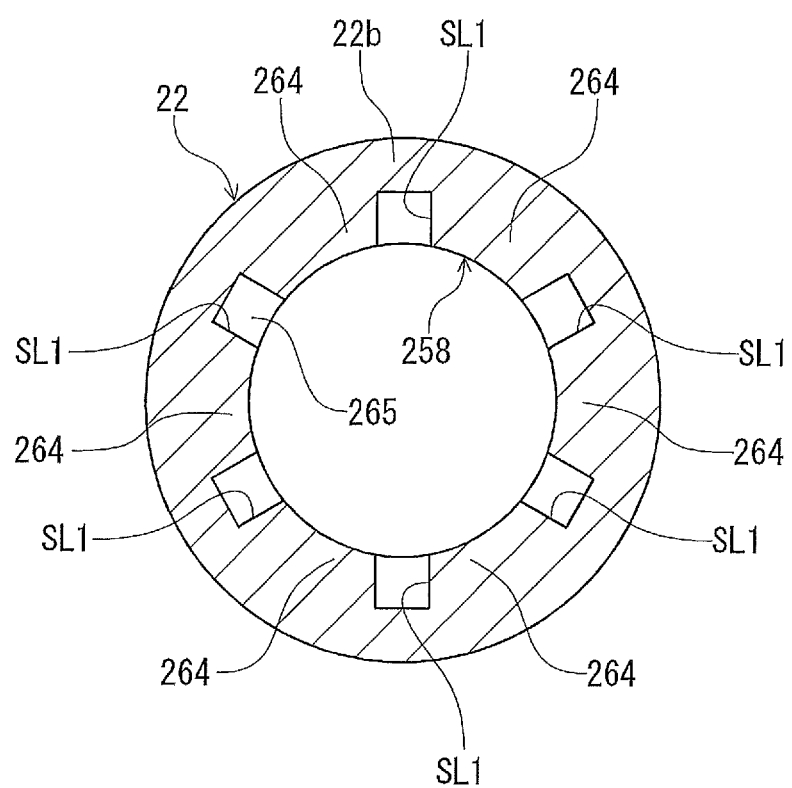
FIG. 15 is a cross-sectional view of the cam member taken along line XV-XV of FIG. 14.
Figure 16:
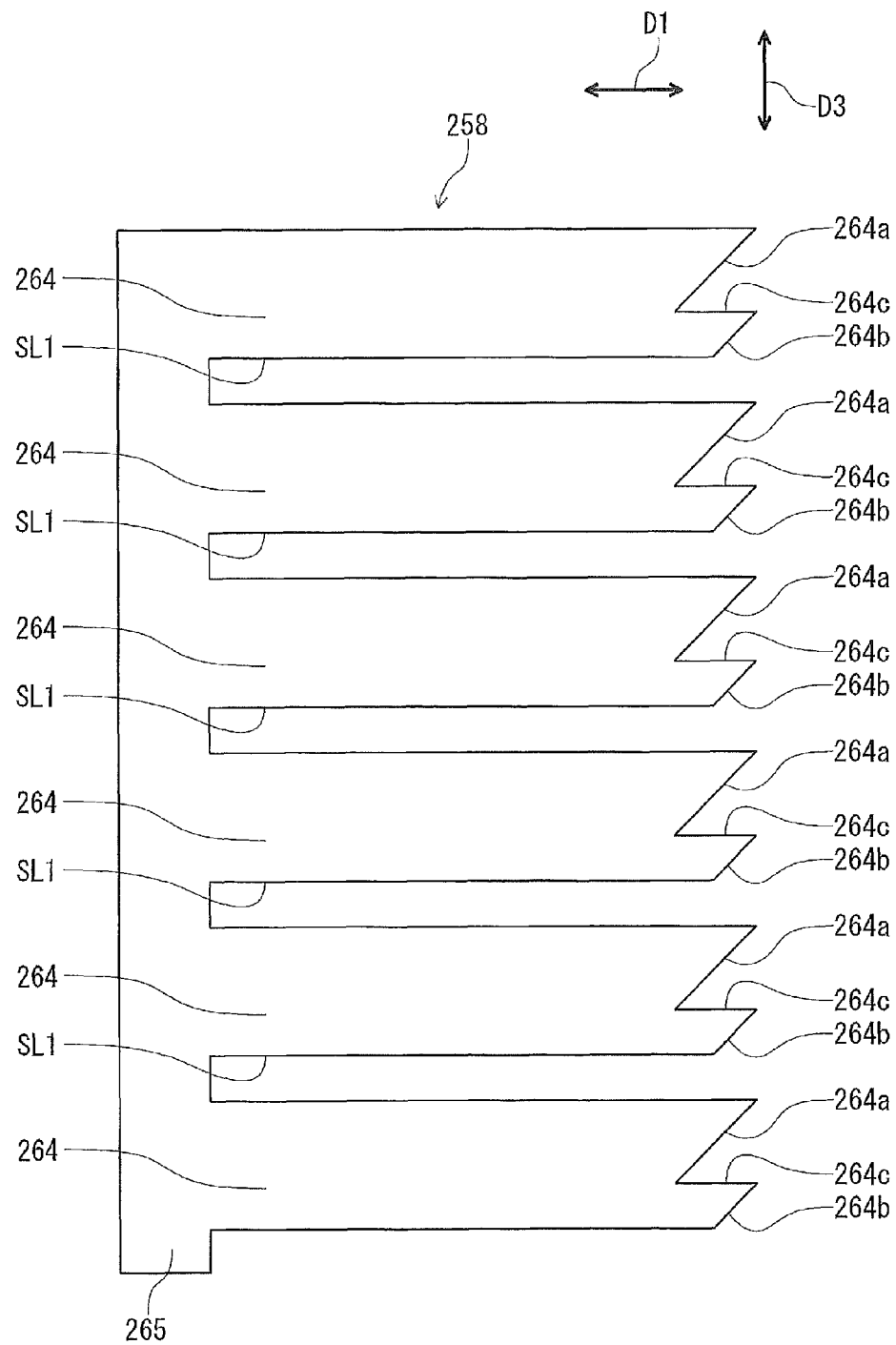
FIG. 16 is a development view of the cam member illustrated in FIG. 14 when viewed from a radially outer side of the cam member with a housing omitted.

As seen in FIGS. 14 to 16, the cam member 258 includes cam portions 264 and an annular end portion 265. The cam portions 264 are provided on the inner peripheral surface of the housing 22 (the second portion 22b). As seen in FIG. 15, the cam portions 264 are circumferentially arranged and are spaced apart from each other to define slits SL1 therebetween. The cam portions 264 protrude radially inward from the inner peripheral surface of the housing 22 (the second portion 22b). As seen in FIGS. 14 and 16, the cam portions 264 extend in the axial direction D1 from the annular end portion 265.

As seen in FIG. 16, each of the cam portions 264 includes a first cam surface 264a and a second cam surface 264b. The first cam surface 264a is inclined relative to the axial direction D1 and is substantially parallel to a radial direction of the rotatable member 256 (a direction perpendicular to a paper surface of FIG. 16). The second cam surface 264b is inclined relative to the axial direction D1 and is substantially parallel to the radial direction of the rotatable member 256 (the direction perpendicular to a paper surface of FIG. 16). In the illustrated embodiment, each of the first cam surface 264a and the second cam surface 264b is inclined relative to the axial direction D1 at an angle substantially equal to the inclination angle AG1 of the sliding surface 262a (FIG. 13). Each of the first cam surface 264a and the second cam surface 264b is configured to circumferentially guide the cam follower 262 (FIGS. 11 to 13).

As seen in FIG. 16, each of the cam portions 264 includes a stopper surface 264c provided between the first cam surface 264a and the second cam surface 264b. The stopper surface 264c is substantially parallel to the axial direction D1 and the radial direction of the rotatable member 256 (the direction perpendicular to a paper surface of FIG. 16). The first cam surface 264a and the stopper surface 264c are configured to position the cam follower 262 in the axial direction D1 and the circumferential direction D3 of the piston 24 so that the piston 24 is positioned at the first position P1 (FIG. 9).

Figure 17:
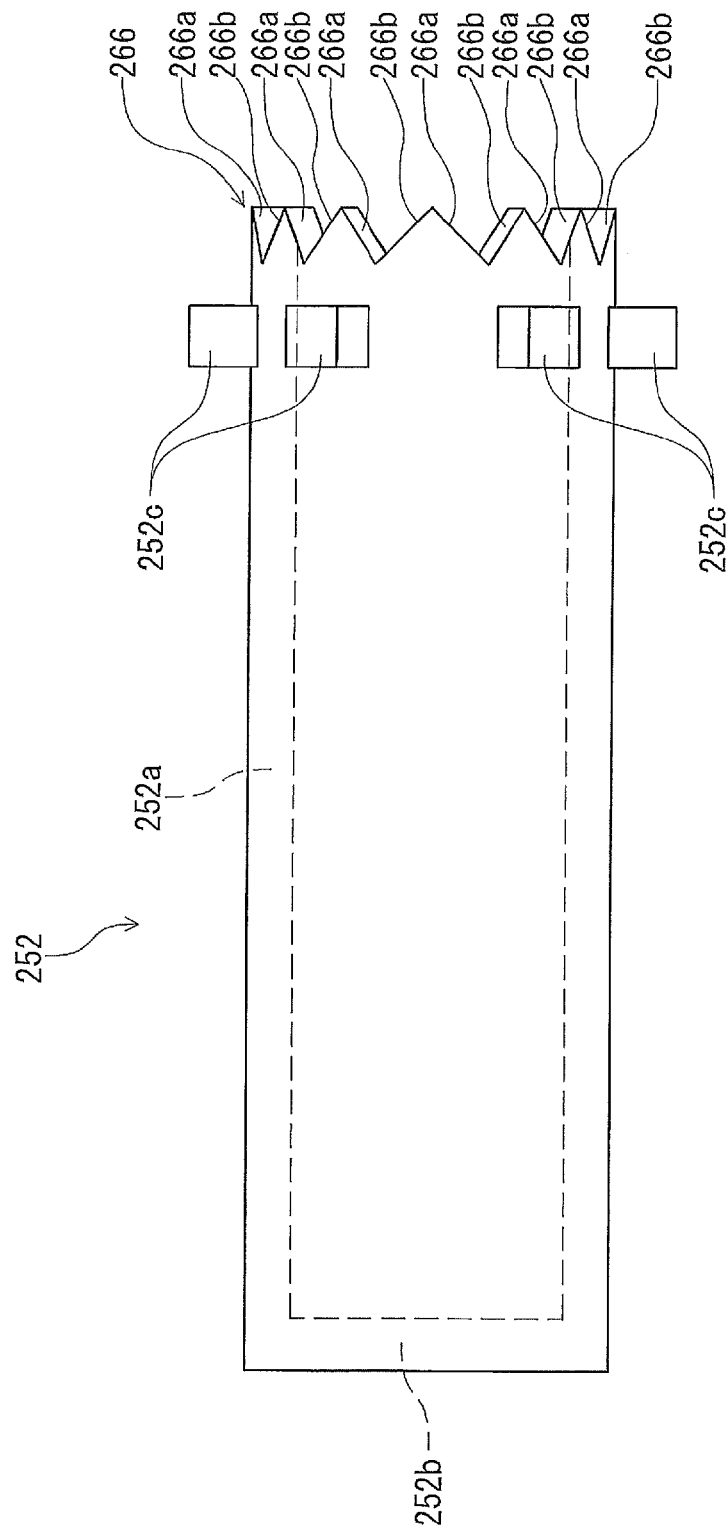
FIG. 17 is a side elevational view of an operating member provided in the bicycle hydraulic quick-release apparatus illustrated in FIG. 9.
Figure 18:
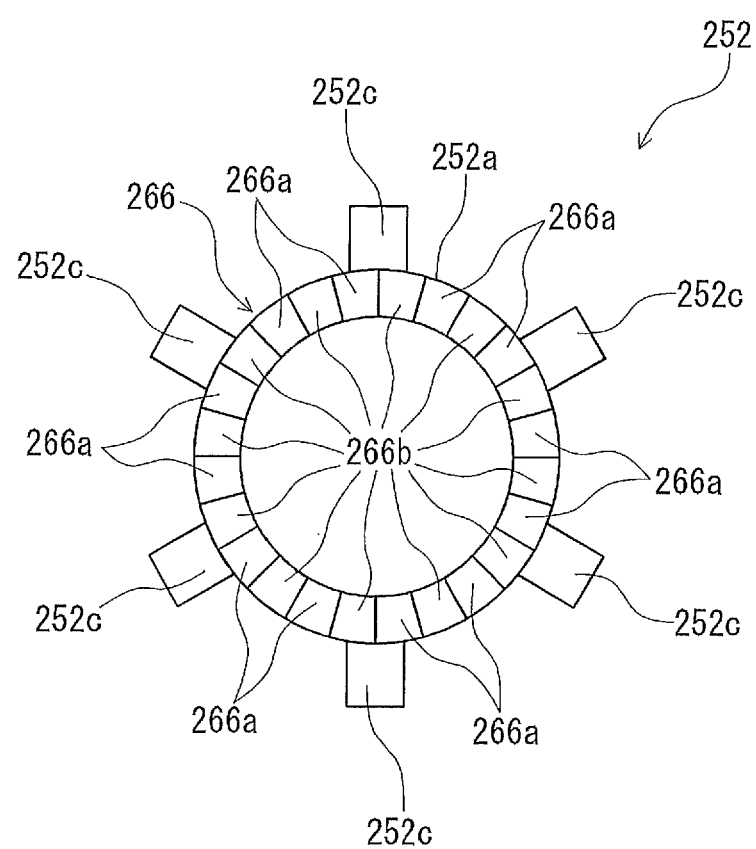
FIG. 18 is a front view of the operating member illustrated in FIG. 17.
Figure 19:
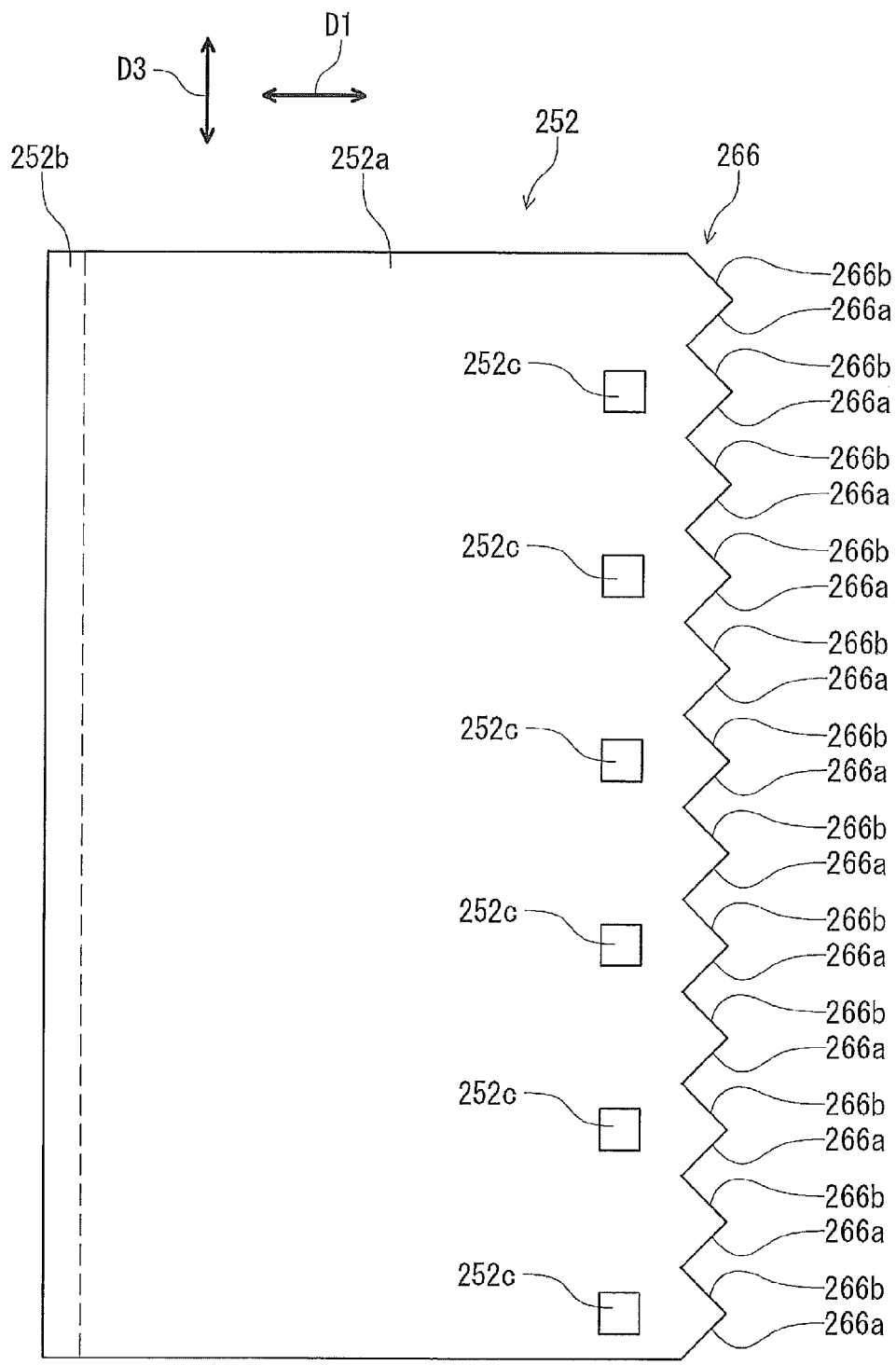
FIG. 19 is a development view of the operating member illustrated in FIG. 17 when viewed from a radially outer side of the operating member.

As seen in FIGS. 9 and 10, the operating member 252 is provided radially inward of the cam member 258 and is movable relative to the cam member 258 in the axial direction D1. As seen in FIGS. 17 to 19, the operating member 252 includes an operating body 252a, an end wall 252b, and protrusions 252c. The operating body 252a has a tubular shape. The end wall 252b is provided at an end of the operating body 252a. The protrusions 252c protrude radially outward from the operating body 252a. As seen in FIGS. 9 and 10, the tubular part 260 of the rotatable member 256 is partially provided in the operating body 252a.

As seen in FIGS. 17 to 19, the operating member 252 includes a guiding part 266 configured to guide the rotatable member 256 in the axial direction D1 and the circumferential direction D3. The guiding part 266 includes first guiding surfaces 266a and second guiding surfaces 266b. The first guiding surfaces 266a and the second guiding surfaces 266b are alternatively arranged in the circumferential direction D3.

As seen in FIG. 19, each of the first guiding surfaces 266a is inclined relative to the axial direction D1 and is substantially parallel to the radial direction of the operating member 252 (a direction perpendicular to a paper surface of FIG. 19). Each of the second guiding surfaces 266b is inclined relative to the axial direction D1 and is substantially parallel to the radial direction of the operating member 252. In the illustrated embodiment, each of the first guiding surfaces 266a is inclined relative to the axial direction D1 at an angle substantially equal to the inclination angle AG1 of the sliding surface 262a (FIG. 13).

Figure 20:
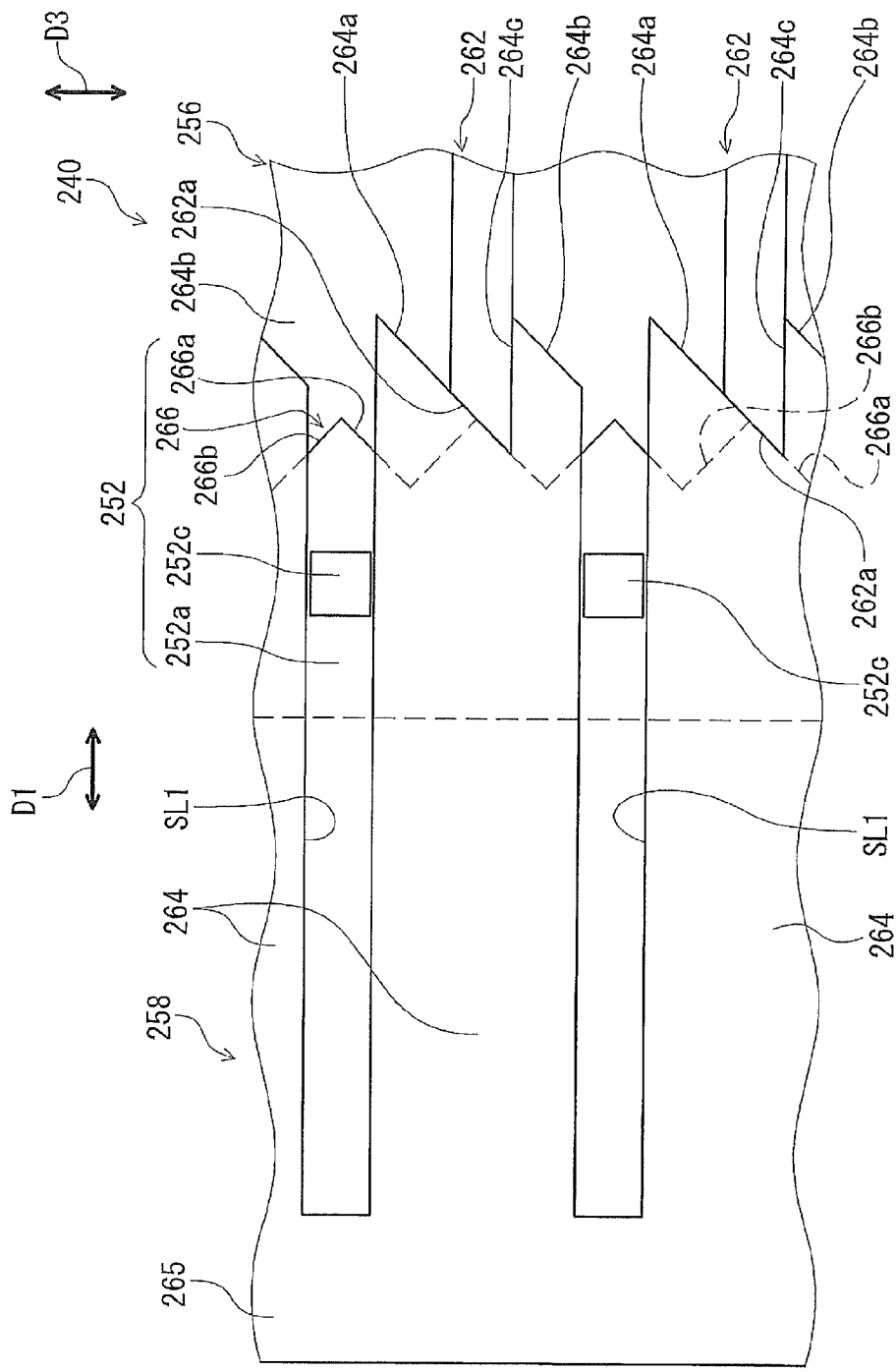
FIG. 20 is a development view of a positioning structure provided in the bicycle hydraulic quick-release apparatus illustrated in FIG. 9 for explaining operation of the positioning structure.

The operation of the positioning structure 240 will be described in detail below referring to FIGS. 20 to 23. In FIG. 20, the positioning structure 240 positions the piston 24 at the first position P1 as shown in FIG. 9. In FIG. 22, the positioning structure 240 positions the piston 24 at the second position P2 as shown in FIG. 10.

As seen in FIG. 20, the cam portions 264 are configured to position the rotatable member 256 in the axial direction D1 and the circumferential direction D3 so that the piston 24 is disposed at the first position P1 (FIG. 9). More specifically, the first cam surface 264a and the stopper surface 264c of the cam portion 264 are configured to position the cam follower 262 in the axial direction D1 and the circumferential direction D3. The sliding surface 262a of the cam follower 262 is slidable with the first cam surface 264a of the cam portion 264. The operating member 252 is disposed adjacent to the rotatable member 256. In this state, the operating member 252 is movable relative to the rotatable member 256 and the cam member 258.

Figure 21:
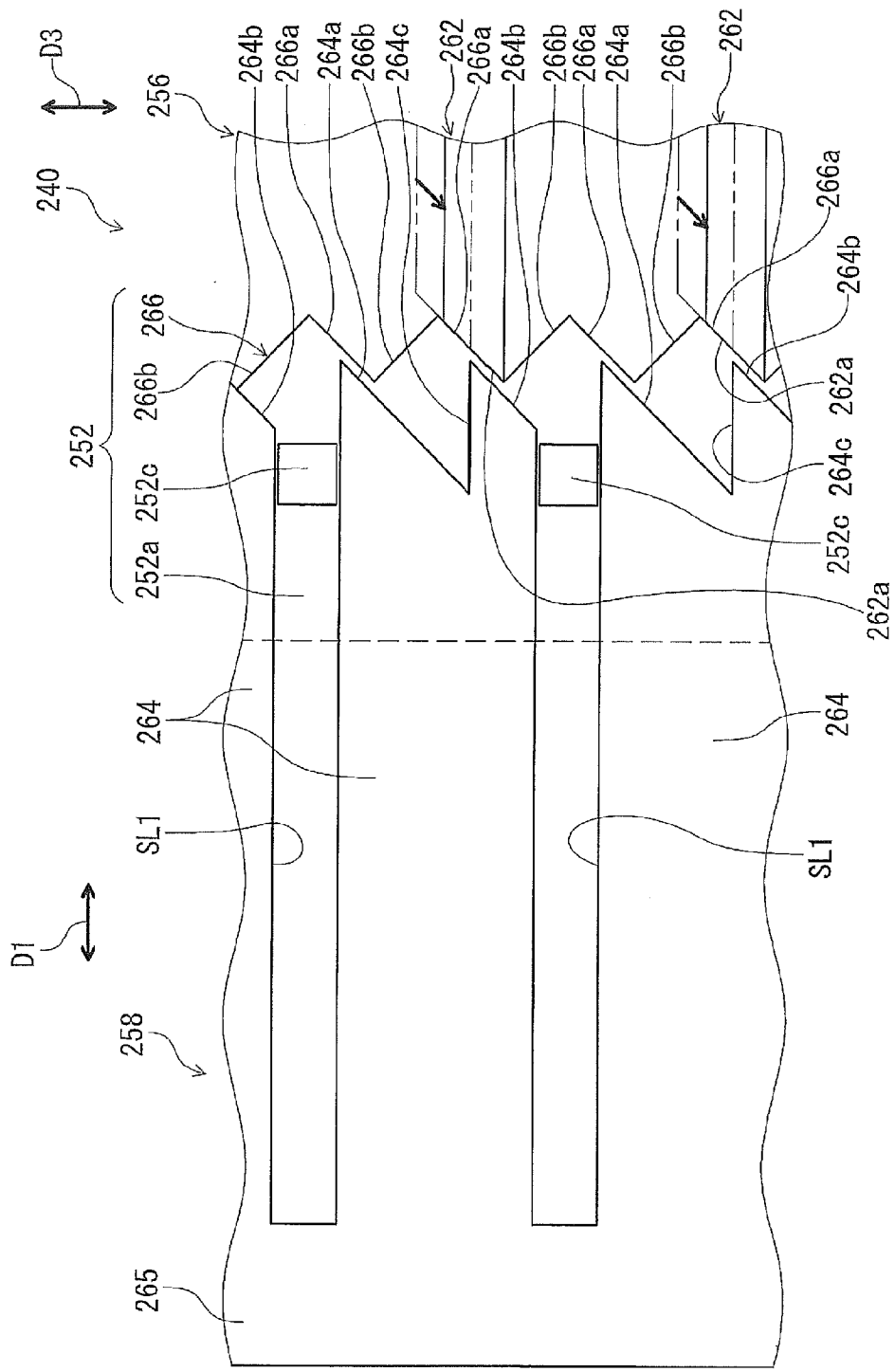
FIG. 21 is a development view of the positioning structure provided in the bicycle hydraulic quick-release apparatus illustrated in FIG. 9 for explaining operation of the positioning structure.
Figure 22:
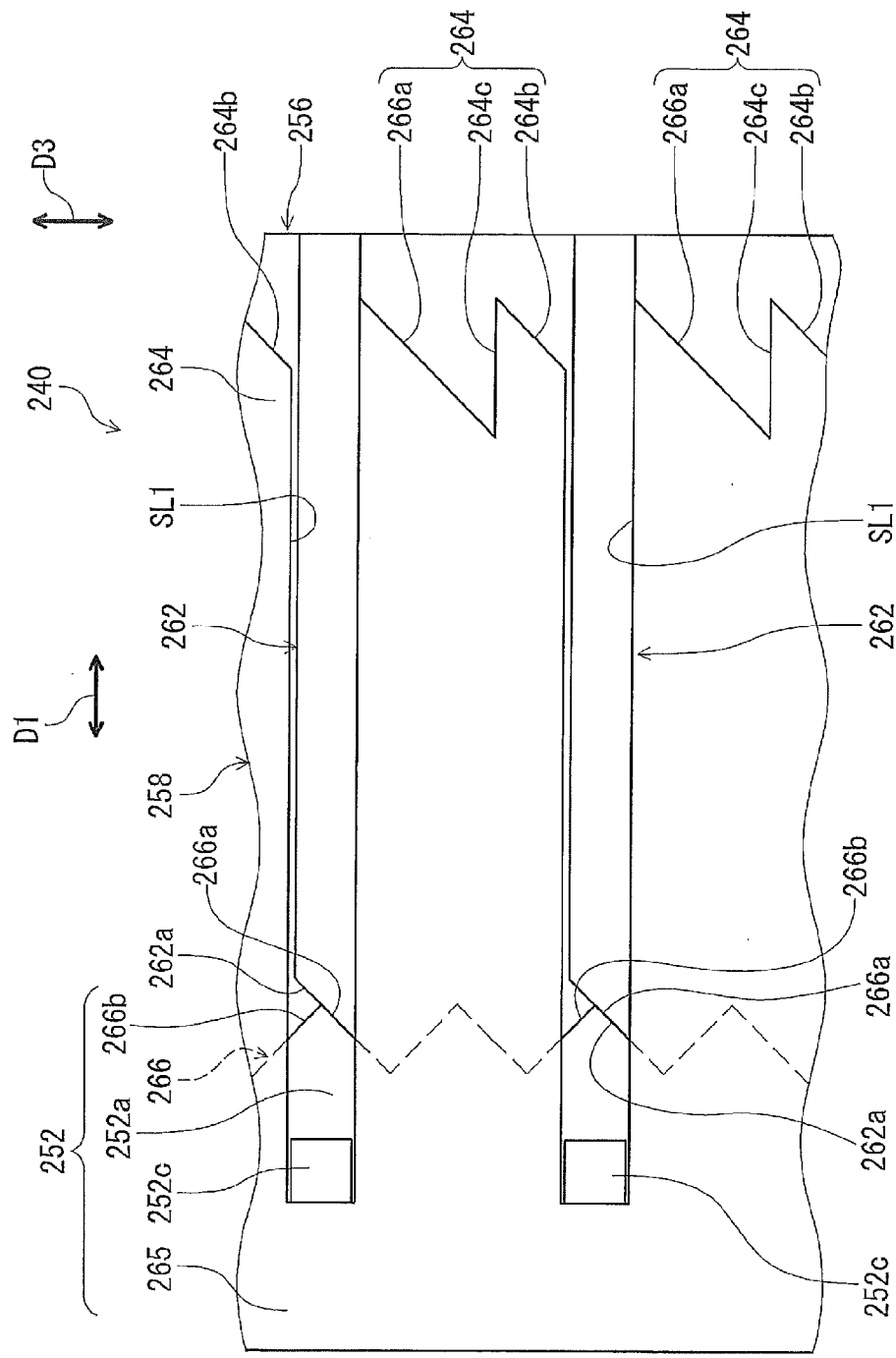
FIG. 22 is a development view of a positioning structure provided in the bicycle hydraulic quick-release apparatus illustrated in FIG. 9 for explaining operation of the positioning structure.

As seen in FIG. 21, the operating member 252 is pressed by a user against the biasing force of the biasing member 50 toward the rotatable member 256. This moves the rotatable member 256 relative to the cam member 258 in the axial direction D1. At this time, the sliding surface 262a of the cam follower 262 slides with the first guiding surface 266a of the operating member 252 so that the cam follower 262 is guided in the circumferential direction D3. The second guiding surface 266b of the operating member 252 contacts the cam follower 262 to hold the cam follower 262 together with the first guiding surface 266a in the axial direction D1 and the circumferential direction D3.

As seen in FIG. 22, releasing the pressing force from the user causes the operating member 252 to be moved relative to the cam member 258 in the axial direction D1 by the biasing force of the biasing member 50. At this time, the sliding surface 262a of the cam follower 262 slides with the second cam surface 264b, causing the cam follower 262 to be inserted into the slit SL1.

The first guiding surface 266a of the operating member 252 contacts the sliding surface 262a of the cam follower 262 to position the cam follower 262 relative to the cam member 258 in the axial direction D1. Adjacent two of the cam portions 264 position the cam follower 262 in the circumferential direction D3. The protrusions 252c contact the annular end portion 265 of the cam member 258 so that the operating member 252 and the rotatable member 256 are positioned relative to the cam member 258 in the axial direction D1. In this state, as seen in FIG. 10, the piston 24 is positioned at the second position P2 by the positioning structure 240.

Figure 23:
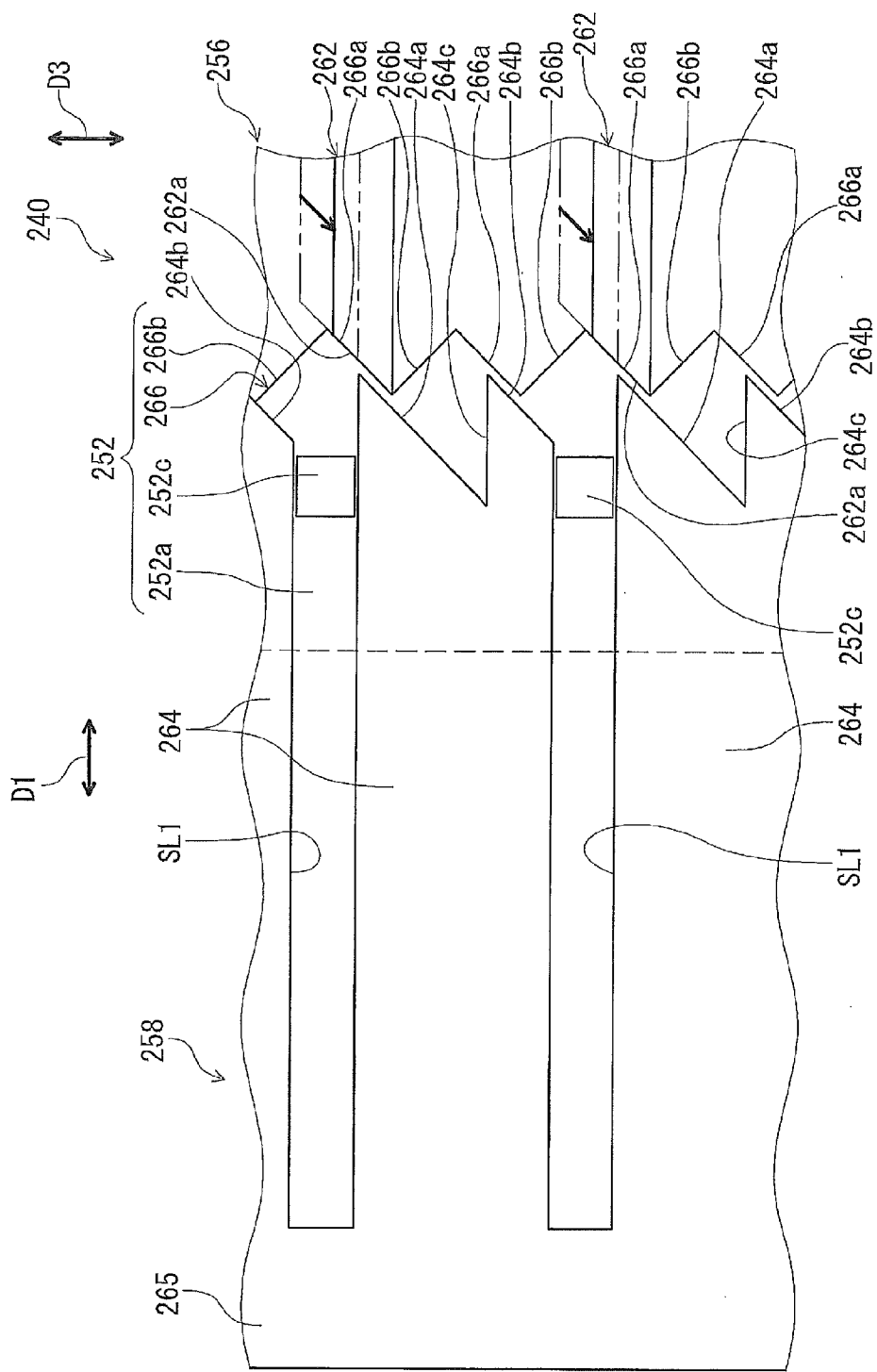
FIG. 23 is a development view of a positioning structure provided in the bicycle hydraulic quick-release apparatus illustrated in FIG. 9 for explaining operation of the positioning structure.

As seen in FIG. 23, the operating member 252 is again pressed by the user against the biasing force of the biasing member 50 toward the rotatable member 256 to be moved relative to the cam member 258. This moves the rotatable member 256 relative to the cam member 258 in the axial direction D1. At this time, the sliding surface 262a of the cam follower 262 slides with the first guiding surface 266a so that the cam follower 262 is guided in the circumferential direction D3. The second guiding surface 266b contacts the cam follower 262 to position the cam follower 262 together with the first guiding surface 266a in the axial direction D1 and the circumferential direction D3.

As seen in FIG. 20, releasing the pressing force from the user causes the operating member 252 to be moved relative to the cam member 258 in the axial direction D1 by the biasing force of the biasing member 50. At this time, the sliding surface 262a of the cam follower 262 slides with the first cam surface 264a until the cam follower 262 contacts the stopper surface 264c. In the state where the cam followers 262 are pressed against the cam portions 264 by the biasing force of the biasing member 50, as seen in FIG. 9, the piston 24 is positioned at the first position P1 by the positioning structure 240.

With the bicycle hydraulic quick-release apparatus 212, it is possible to obtain the same advantageous effect as that of the bicycle hydraulic quick-release apparatus 12 in accordance with the first embodiment.

Third Embodiment

Figure 24:
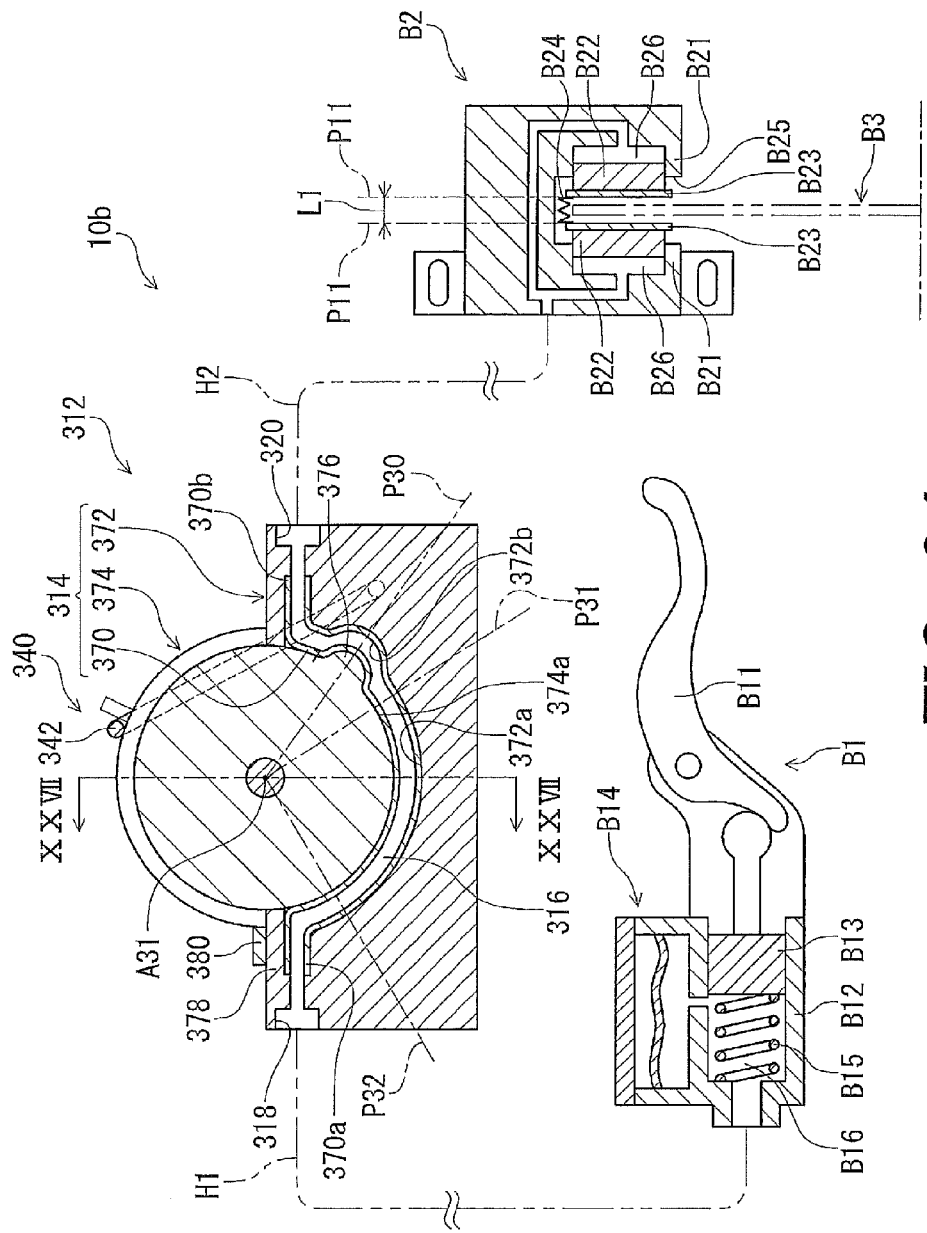
FIG. 24 is a cross-sectional view of a bicycle braking system including a bicycle hydraulic quick-release apparatus in accordance with a third embodiment (initial position)
Figure 25:
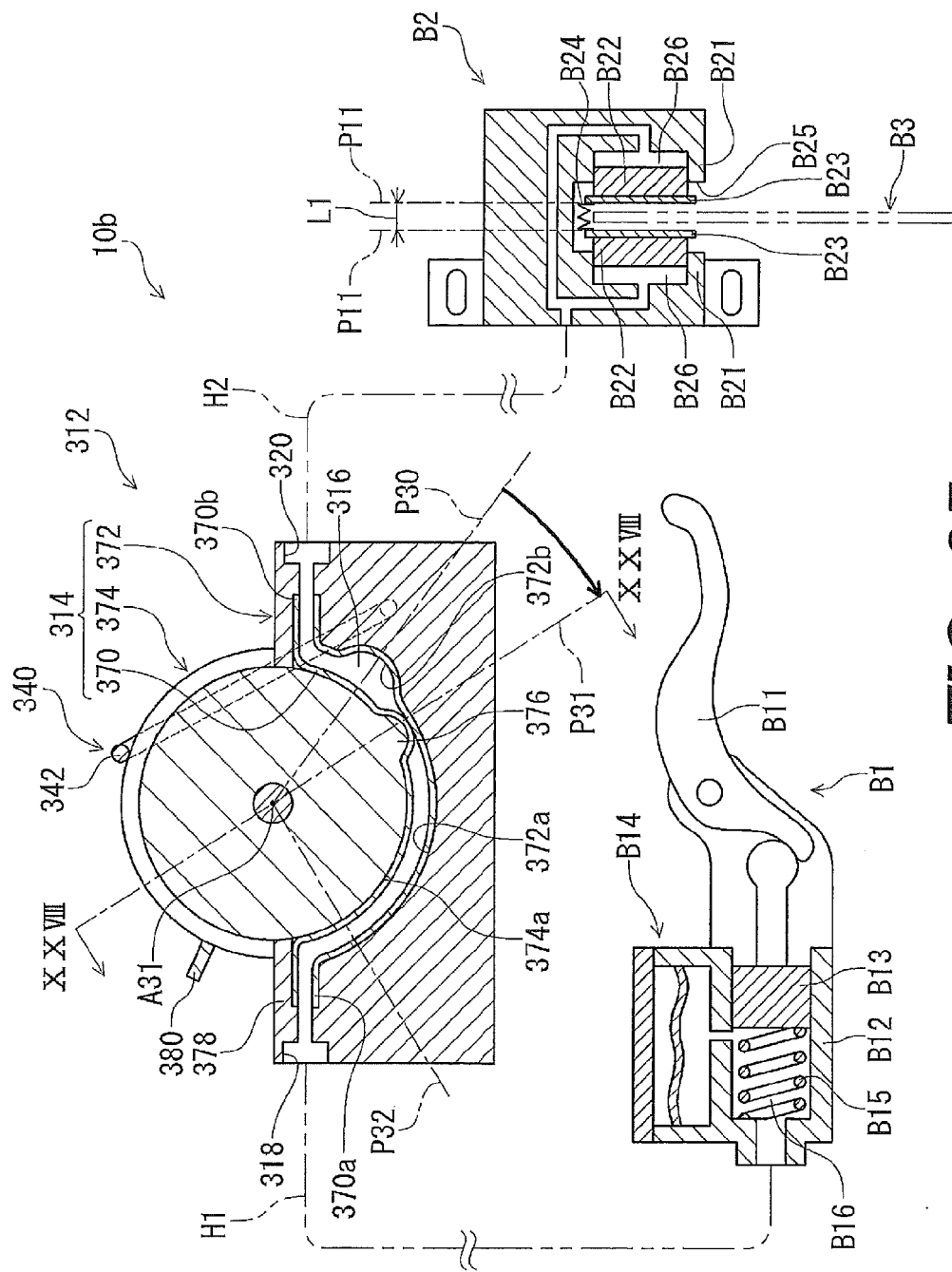
FIG. 25 is a cross-sectional view of the bicycle braking system including the bicycle hydraulic quick-release apparatus illustrated in FIG. 24 (first position)
Figure 26:
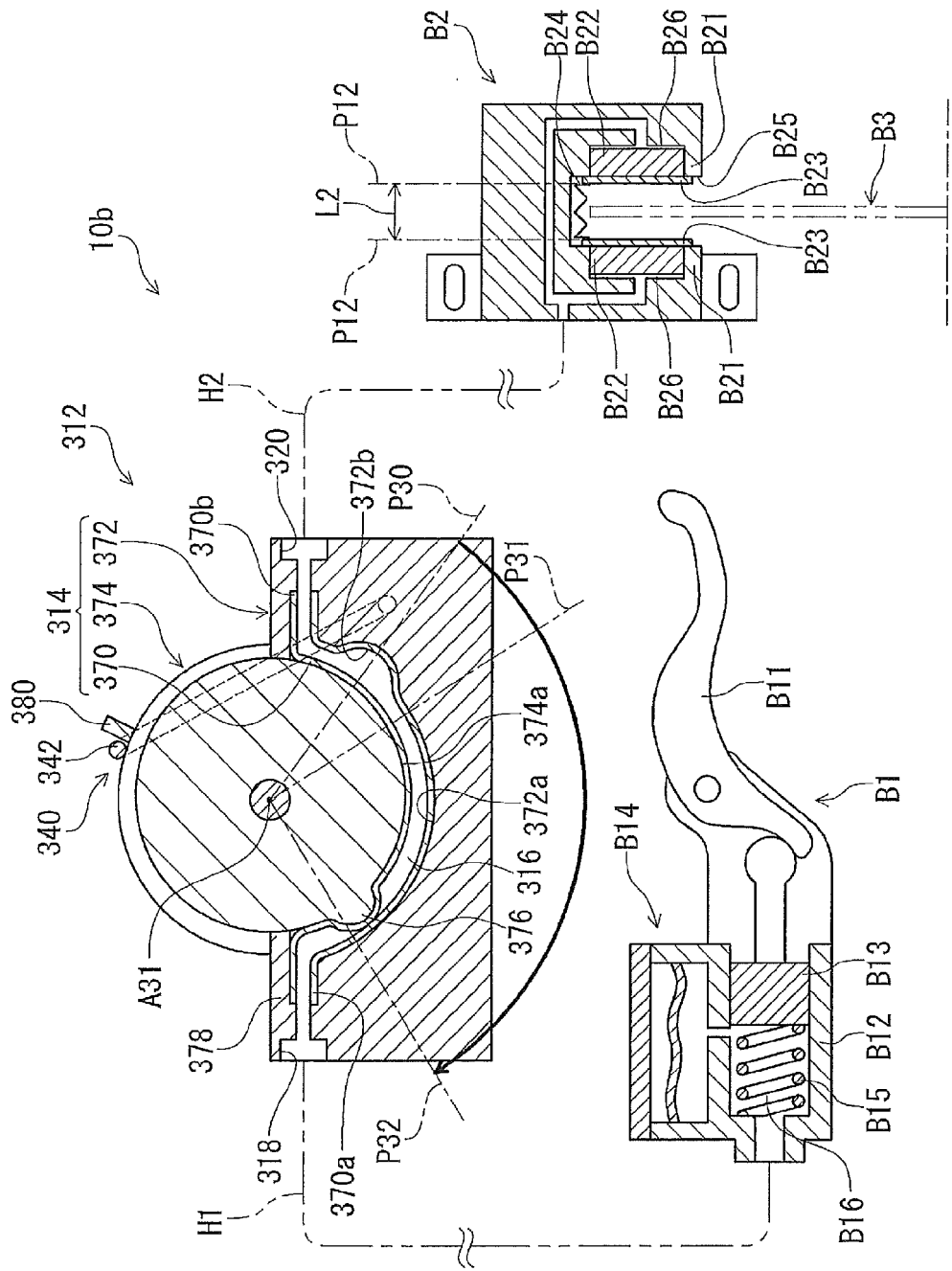
FIG. 26 is a cross-sectional view of the bicycle braking system including the bicycle hydraulic quick-release apparatus illustrated in FIG. 24 (second position)

Referring to FIGS. 24 to 26, a bicycle braking system 10b includes a bicycle hydraulic quick-release apparatus 312 in accordance with a third embodiment. The bicycle hydraulic quick-release apparatus 312 will be described below referring to FIGS. 24 to 29. Elements having substantially the same function as those in the above embodiments will be numbered the same here, and will not be described and/or illustrated again in detail here for the sake of brevity.

As seen in FIG. 24, the bicycle hydraulic quick-release apparatus 312 comprises a main body 314 and a hydraulic chamber 316. The main body 314 includes a first hole 318 and a second hole 320.

As seen in FIGS. 24 to 26, the hydraulic chamber 316 has a changeable volume as well as the hydraulic chamber 16 in accordance with the first embodiment. The hydraulic chamber 316 is provided between the first hole 318 and the second hole 320.

As seen in FIG. 24, the hydraulic chamber 316 is configured to be in an initial chamber state where a volume of the hydraulic chamber 316 is an initial volume. The hydraulic chamber 316 is connected to the first hole 318 and the second hole 320 in the initial chamber state.

As seen in FIG. 25, the hydraulic chamber 316 is configured to be in a first chamber state where a volume of the hydraulic chamber 316 is a first volume. The hydraulic chamber 316 is disconnected from the first hole 318 and is connected to the second hole 320 in the first chamber state.

As seen in FIG. 26, the hydraulic chamber 316 is configured to be in a second chamber state where the volume of the hydraulic chamber 316 is a second volume different from the first volume. The hydraulic chamber 316 is disconnected from the first hole 318 and is connected to the second hole 320 in the second chamber state.

As seen in FIG. 24, the main body 314 includes a flexible tube 370. The flexible tube 370 includes a first end 370a and a second end 370b opposite to the first end 370a. The first hole 318 is provided at the first end 370a of the flexible tube 370. The second hole 320 is provided at the second end 370b of the flexible tube 370. The hydraulic chamber 316 provided in the flexible tube 370.

Figure 27:
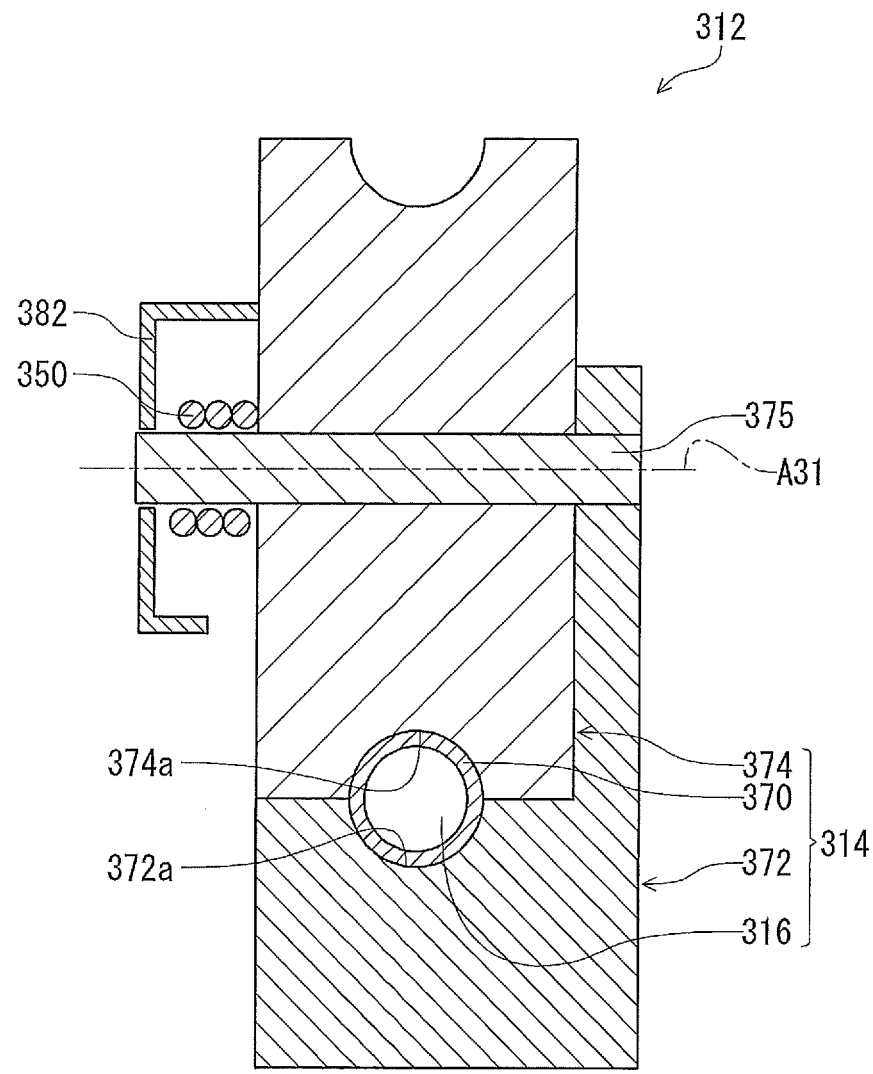
FIG. 27 is a cross-sectional view of the bicycle hydraulic quick-release apparatus taken along ling XXVII-XXVII of FIG. 24.

As seen in FIGS. 24 and 27, the main body 314 includes a first holding member 372 and a second holding member 374. The second holding member 374 is configured to hold the flexible tube 370 together with the first holding member 372 to restrict the flexible tube 370 from expanding in a radial direction of the flexible tube 370 in response to hydraulic pressure in the hydraulic chamber 316. In the illustrated embodiment, as seen in FIG. 27, the first holding member 372 includes a first holding groove 372a. The second holding member 374 includes a second holding groove 374a provided to face the first holding groove 372a. The flexible tube 370 is provided in the first holding groove 372a and the second holding groove 374a.

As seen in FIGS. 24 to 26, the second holding member 374 is movable relative to the first holding member 372 between a first position P31 and a second position P32 with the flexible tube 370 being restricted from expanding in the radial direction. In the illustrated embodiment, the second holding member 374 is movable relative to the first holding member 372 between an initial position P30 and a second position P32 to keep restricting the flexible tube 370 from expanding in the radial direction. The first position P31 is disposed between the initial position P30 and the second position P32.

As seen in FIGS. 24 to 26, the second holding member 374 is rotatable relative to the first holding member 372 about a rotational axis A31 between the initial position P30 and the second position P32 to keep restricting the flexible tube 370 from expanding in the radial direction of the flexible tube 370. The second holding member 374 has a columnar shape and is rotatably provided relative to the first holding member 372 about the rotational axis A31. More specifically, as seen in FIG. 27, the second holding member 374 is rotatably supported by a shaft 375 secured to the first holding member 372.

As seen in FIG. 24, the initial position P30 corresponds to the initial chamber state of the hydraulic chamber 316. As seen in FIG. 25, the first position P31 corresponds to the first chamber state of the hydraulic chamber 316. As seen in FIG. 26, the second position P32 corresponds to the second chamber state of the hydraulic chamber 316.

As seen in FIGS. 24 to 26, the second holding member 374 includes a pressing member 376 configured to press the flexible tube 370 in response to movement of the second holding member 374 from the first position P31 to the second position P32 so as to change the volume of the hydraulic chamber 316 from the first volume to the second volume. The pressing member 376 is movable integrally with the second holding member 374 relative to the first holding member 372. In the illustrated embodiment, the pressing member 376 is rotatable integrally with the second holding member 374 relative to the first holding member 372 about the rotational axis A31. Each of the initial position P30, the first position P31, and the second position P32 is defined based on the rotational axis A31 and the pressing member 376.

As seen in FIG. 24, the first holding groove 372a includes a recess 372b. The recess 372b is disposed at a position corresponding to the initial position P30. The pressing member 376 is provided between the recess 372b and the rotational axis A31 in the state where the second holding member 374 is positioned at the initial position P30. In this state, the hydraulic chamber 316 is connected to the first hole 318 and the second hole 320 and is defined in the flexible tube 370 between the first hole 318 and the second hole 320. The first hole 318 is in fluid communication with the second hole 320 via the flexible tube 370.

Figure 28:
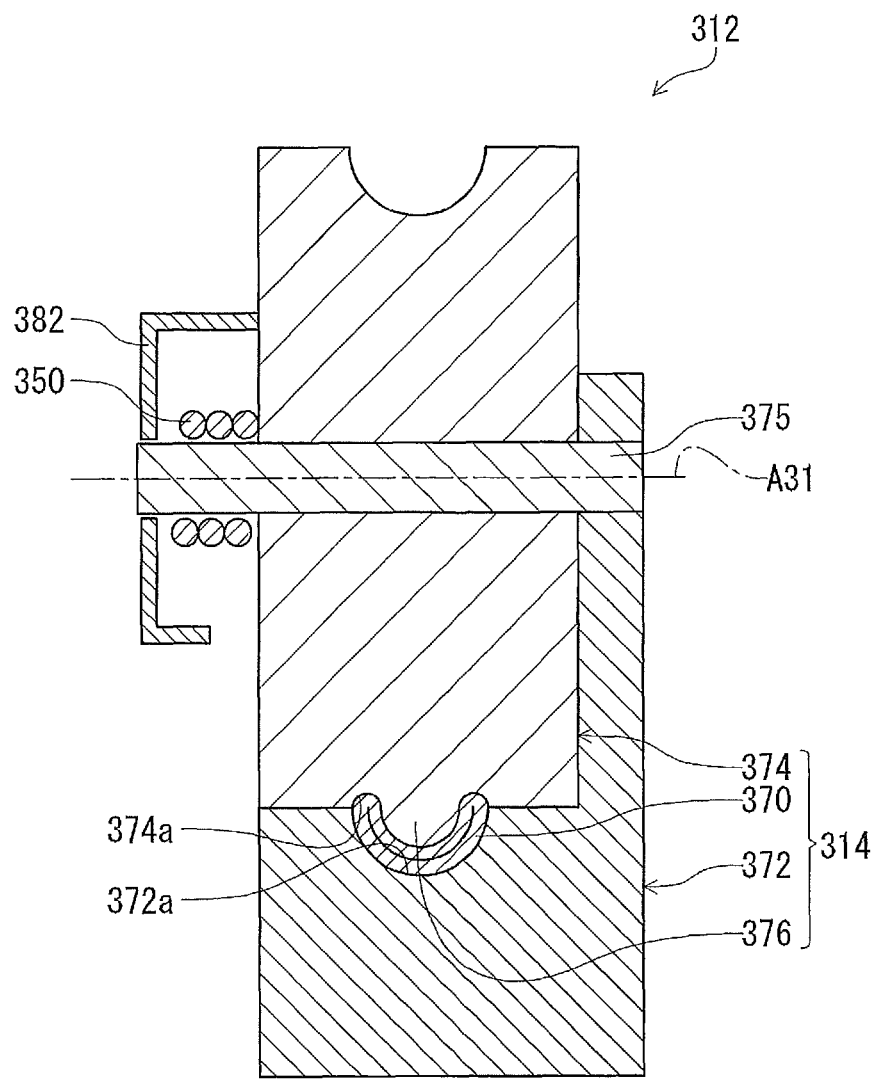
FIG. 28 is a cross-sectional view of the bicycle hydraulic quick-release apparatus taken along ling XXVIII-XXVIII of FIG. 25.

As seen in FIGS. 25 and 28, in the state where the second holding member 374 is positioned at the first position P31, the pressing member 376 presses the flexible tube 370 against the first holding member 372 so that the first hole 318 is disconnected from the second hole 320. More specifically, the pressing member 376 protrudes from the second holding groove 374a of the second holding member 374 toward the first holding groove 372a of the first holding member 372. The flexible tube 370 is partially sandwiched between the pressing member 376 and the first holding member 372. An internal space of the flexible tube 370 is divided by the pressing member 376 and the first holding member 372. In this state, the hydraulic chamber 316 is defined in the flexible tube 370 between the pressing member 376 and the second hole 320.

As seen in FIG. 26, in the state where the second holding member 374 is positioned at the second position P32, the pressing member 376 presses the flexible tube 370 against the first holding member 372 so that the first hole 318 is disconnected from the second hole 320. In this second chamber state, the hydraulic chamber 316 is defined in the flexible tube 370 between the pressing member 376 and the second hole 320. The second volume of the hydraulic chamber 316 in the second chamber state is greater than the first volume of the hydraulic chamber 316 in the first chamber state.

As seen in FIG. 26, the bicycle hydraulic quick-release apparatus 312 further comprises a positioning structure 340 configured to position the second holding member 374 at the second position P32 relative to the first holding member 372. In the illustrated embodiment, the positioning structure 340 includes a coupling member 342 configured to couple the second holding member 374 to the first holding member 372 so that the second holding member 374 is positioned at the second position P32. In the illustrated embodiment, as seen in FIG. 29, the coupling member 342 is a bended wire and is pivotably attached to the first holding member 372.

As seen in FIG. 24, the positioning structure 340 is further configured to position the second holding member 374 at the initial position P30 relative to the first holding member 372. In the illustrated embodiment, the positioning structure 340 includes a first stopper 378 and a second stopper 380. The first stopper 378 is provided on the first holding member 372. The second stopper 380 is provided on the second holding member 374 and is contactable with the first stopper 378. The second stopper 380 contacts the first stopper 378 in a state where the second holding member 374 is positioned at the initial position P30. The second stopper 380 is spaced apart from the first stopper 378 in a state where the second holding member 374 is positioned at each of the first position P31 and the second position P32. As seen in FIG. 26, the coupling member 342 is configured to engage with the second stopper 380 so that the second holding member 374 is positioned at the second position P32. The coupling member 342 is operated by a user.

Figure 29:
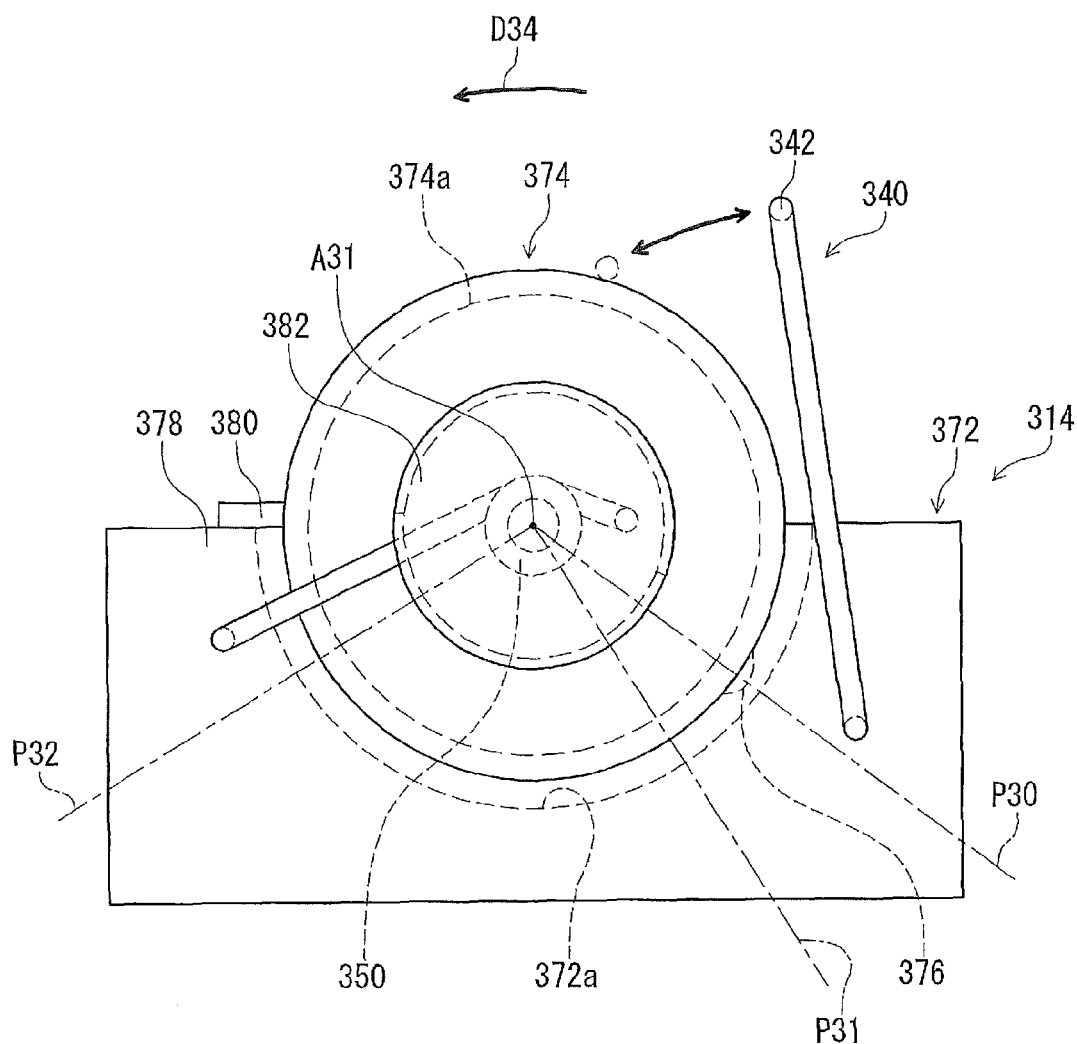
FIG. 29 is a side elevational view of the bicycle hydraulic quick-release apparatus illustrated in FIG. 24.

As seen in FIG. 29, the positioning structure 340 includes a biasing member 350 configured to bias the second holding member 374 toward the first position P31. In the illustrated embodiment, the biasing member 350 is configured to bias the second holding member 374 to rotate the second holding member 374 relative to the first holding member 372 in a first rotational direction D34. For example, the biasing member 350 is a torsion spring. The second stopper 380 is pressed against the first stopper 378 by the biasing force of the biasing member 350 in the initial chamber state.

As seen in FIGS. 27 to 29, the bicycle hydraulic quick-release apparatus 312 further comprises an operating member 382. The operating member 382 is rotatable integrally with the second holding member 374 between the initial position P30 and the second position P32. The operating member 382 is secured to the second holding member 374. The operating member 382 is configured to be operated by the user to rotate the second holding member 374 relative to the first holding member 372. The operating member 382 can be integrally provided with the second holding member 374.

The operation of the bicycle hydraulic quick-release apparatus 312 will be described in detail below referring to FIGS. 24 to 29. As seen in FIGS. 24 and 29, the operating member 382 is rotated by the user so that the second holding member 374 is rotated relative to the first holding member 372 toward the first position P31 against the biasing force of the biasing member 350. As seen in FIG. 25, the pressing member 376 starts to slide with the flexible tube 370 to press the flexible tube 370 against the first holding member 372 around the first position P31.

As seen in FIGS. 25, 26 and 28, the pressing member 376 slides with the flexible tube 370 to press the flexible tube 370 against the first holding member 372 while rotating relative to the first holding member 372 together with the second holding member 374 from the first position P31 to the second position P32. This increases the volume of the hydraulic chamber 316 from the first volume to the second volume. The second holding member 374 is coupled to the first holding member 372 via the coupling member 342 to position the second holding member 374 at the second position P32. Thus, the brake caliper B2 changes from the usage state to the maintenance state, allowing the user to replace a wheel into a new wheel (not shown), for example.

With the bicycle hydraulic quick-release apparatus 312, the hydraulic chamber 316 is configured to be in the first chamber state (FIG. 25) where the volume of the hydraulic chamber 316 is the first volume. The hydraulic chamber 316 is configured to be in the second chamber state (FIG. 26) where the volume of the hydraulic chamber 316 is the second volume different from the first volume.

In a case where the hydraulic chamber 316 is connected to the brake caliper B2, for example, changing the hydraulic chamber 316 between the first chamber state and the second chamber state switches the brake caliper B2 between the usage state (FIG. 25) and the maintenance state (FIG. 26). Accordingly, it is possible to quickly switch the usage state and the maintenance state where a wheel can be easily detached and attached.

Furthermore, since the hydraulic chamber 316 is disconnected from the first hole 318 in the second chamber state, the bicycle hydraulic quick-release apparatus 312 can prevent incorrect operation from being transmitted from the brake operating device B1 to the brake caliper B2 in the maintenance state.

Fourth Embodiment

Figure 30:
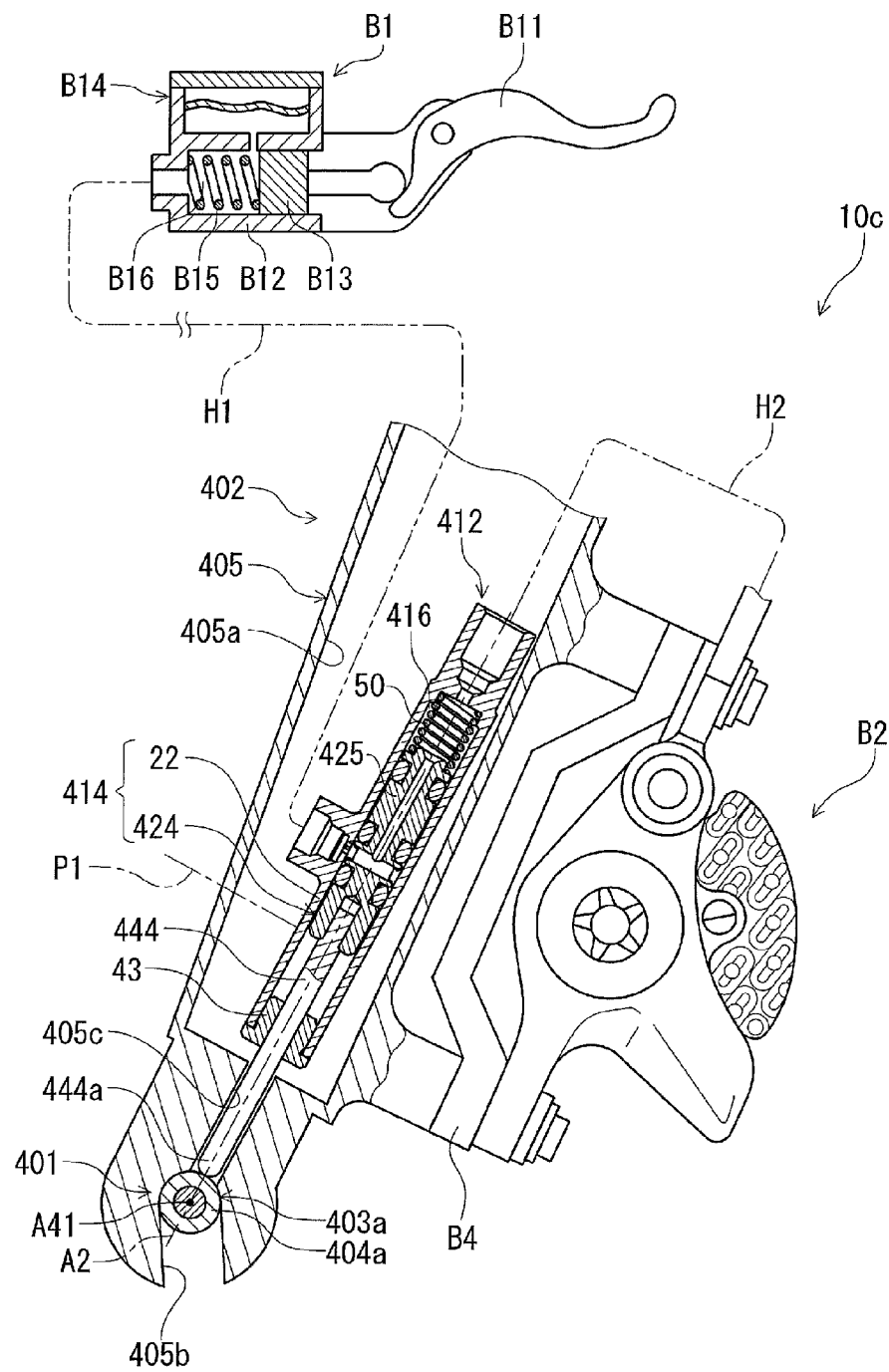
FIG. 30 is a cross-sectional view of the bicycle braking system including a bicycle hydraulic quick-release apparatus in accordance with a fourth embodiment (first position)
Figure 31:
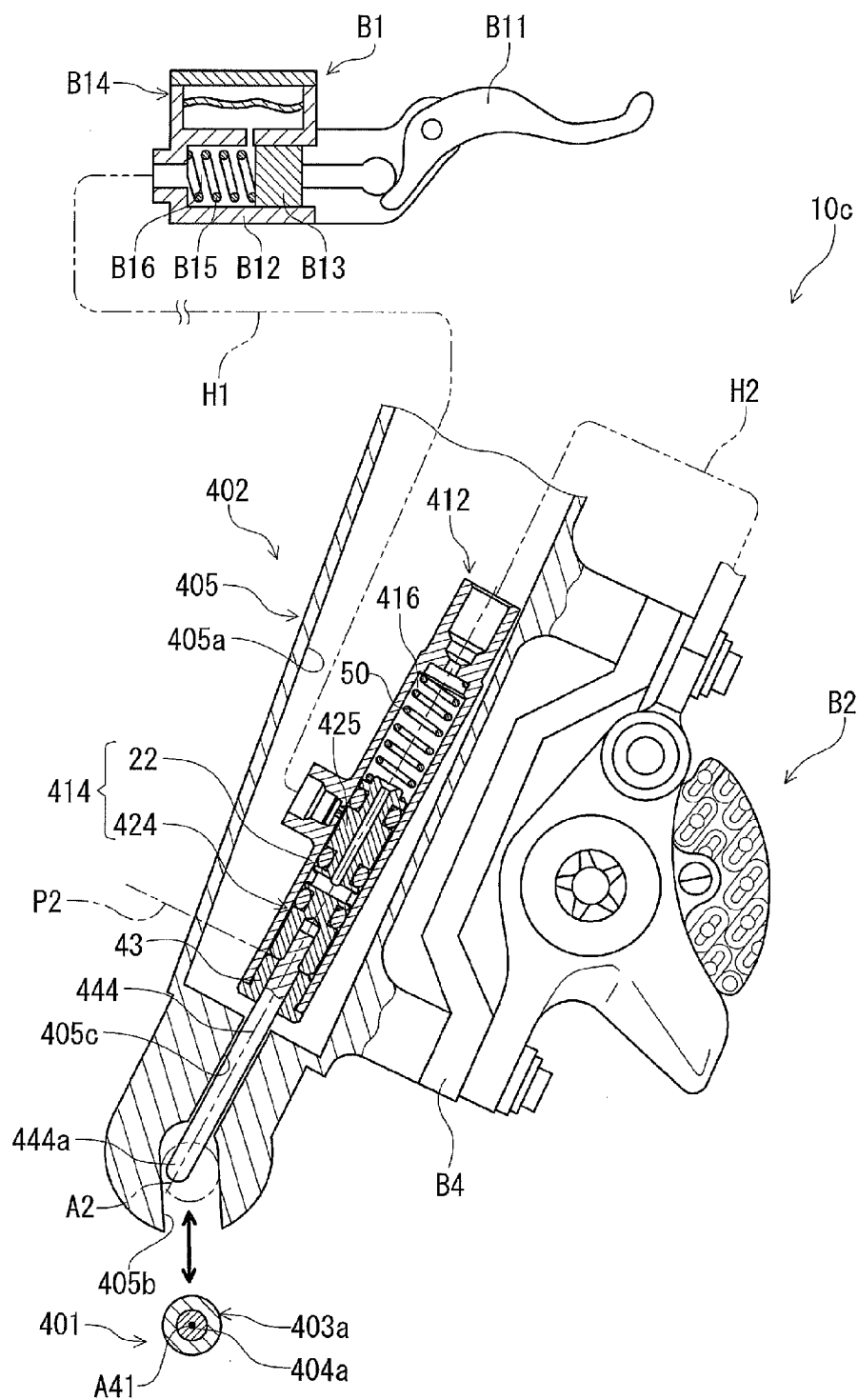
FIG. 31 is a cross-sectional view of the bicycle braking system including the bicycle hydraulic quick-release apparatus illustrated in FIG. 30 (second position)
Figure 32:
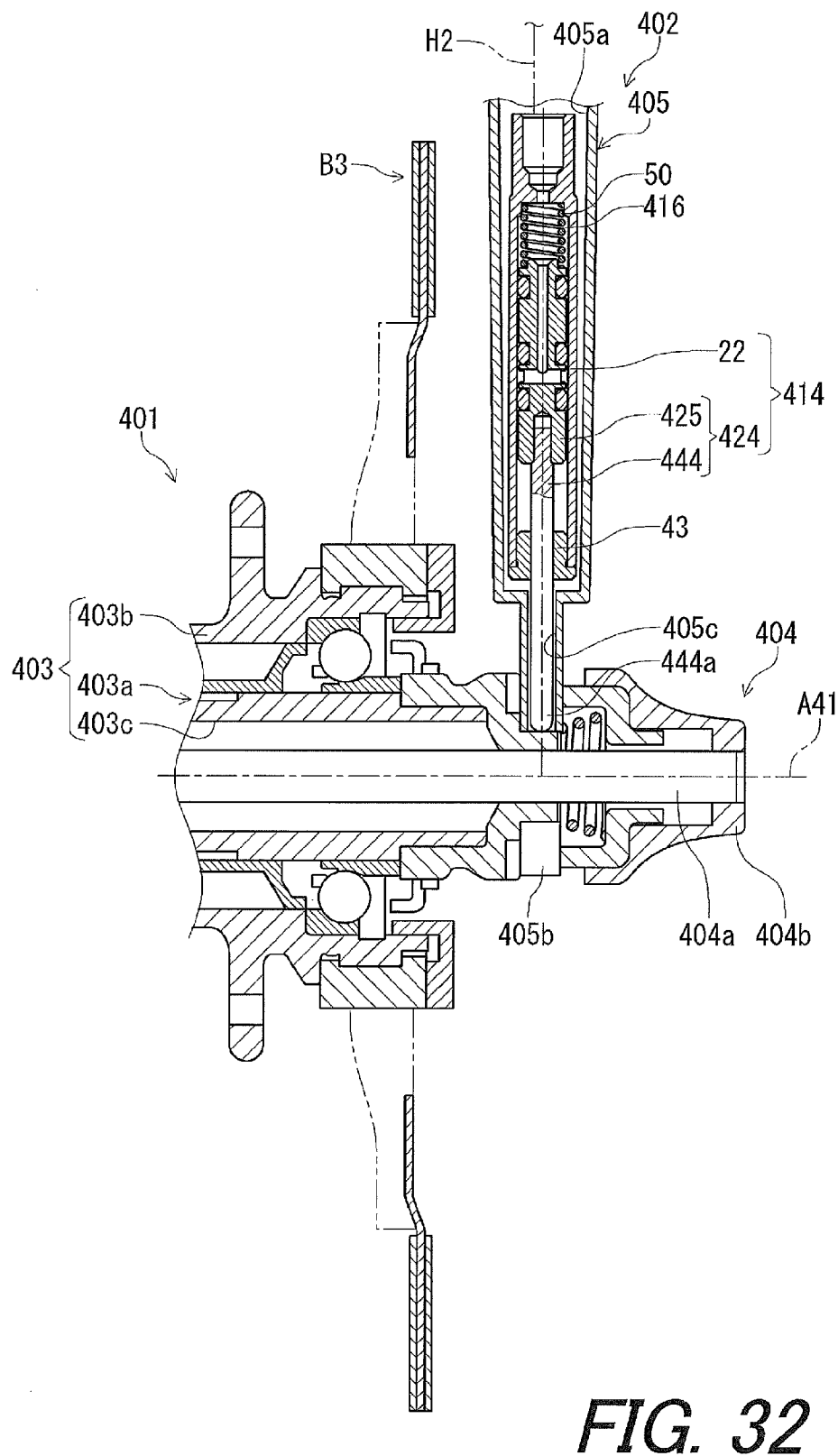
FIG. 32 is a cross-sectional view of the bicycle hydraulic quick-release apparatus illustrated in FIG. 30 (first position)

Referring to FIGS. 30 to 32, a bicycle braking system 10c includes a bicycle hydraulic quick-release apparatus 412 in accordance with a fourth embodiment. The bicycle hydraulic quick-release apparatus 412 will be described below referring to FIGS. 30 to 32. Elements having substantially the same function as those in the above embodiments will be numbered the same here, and will not be described and/or illustrated again in detail here for the sake of brevity.

As seen in FIGS. 30 and 31, the bicycle hydraulic quick-release apparatus 412 comprises a main body 414 and a hydraulic chamber 416. The main body 414 has substantially the same construction as that of the main body 14 in accordance with the first embodiment. The hydraulic chamber 416 has substantially the same construction as that of the hydraulic chamber 16 in accordance with the first embodiment. In the illustrated embodiment, however, the hydraulic chamber 416 is configured to be in the first chamber state (FIG. 30) when a bicycle component 401 is attached to a bicycle frame 402. The hydraulic chamber 416 is configured to be in the second chamber state (FIG. 31) when the bicycle component 401 is detached from the bicycle frame 402. While the bicycle component 401 is a wheel in the illustrated embodiment, any type of component can be applied to the bicycle component 401. In the illustrated embodiment, the bicycle component 401 can be also referred to as a wheel 401.

As seen in FIG. 32, the wheel 401 includes a bicycle hub assembly 403 and a wheel securing assembly 404. The wheel 401 can further include spokes (not shown), a rim (not shown), and a tire (not shown) in addition to the bicycle hub assembly 403 and the wheel securing assembly 404. The bicycle hub assembly 403 includes a hub axle 403a and a hub shell 403b. The hub axle 403a is configured to rotatably support the hub shell 403b about a rotational axis A41. The wheel securing assembly 404 includes a rod 404a and a lock member 404b. The rod 404a extends through a hub through-hole 403c of the hub axle 403a. The lock member 404b is secured to an end of the rod 404a. The wheel securing assembly 404 can further include a cam lever (not shown) and an additional lock member (not shown) in addition to the rod 404a and the lock member 404b if needed and/or desired.

In the illustrated embodiment, as seen in FIGS. 30 and 31, the hydraulic chamber 416 is configured to be in the first chamber state (FIG. 30) when the wheel 401 is attached to the bicycle frame 402. The hydraulic chamber 416 is configured to be in the second chamber state (FIG. 31) when the wheel 401 is detached from the bicycle frame 402. More specifically, the hydraulic chamber 416 is configured to be in the first chamber state (FIG. 30) when the bicycle component 401 is attached to a front fork 405 of the bicycle frame 402. The hydraulic chamber 416 is configured to be in the second chamber state (FIG. 31) when the bicycle component 401 is detached from the front fork 405 of the bicycle frame 402. In the illustrated embodiment, the front fork 405 can be also referred to as a frame body 405.

The bicycle frame 402 comprises the frame body 405 to which the bicycle hub assembly 403 of the wheel 401 is to be attached. The frame body 405 includes an inner cavity 405a, a slit 405b, and an opening 405c. Namely, the front fork 405 includes the inner cavity 405a, the slit 405b, and the opening 405c. The hub axle 403a of the bicycle hub assembly 403 is to extend through the slit 405b. The opening 405c connects the slit 405b to the inner cavity 405a. The hub axle 403a and the rod 404a extend through the slit 405b in an attachment state where the wheel 401 is attached to the bicycle frame 402 (e.g., the front fork 405) via the wheel securing assembly 404.

As seen in FIGS. 30 and 31, the main body 414 is configured to be provided in the bicycle frame 402. In particular, the hydraulic chamber 416 is configured to be provided in the bicycle frame 402. The main body 414 is configured to be at least partially disposed in the inner cavity 405a provided inside the front fork 405. In the illustrated embodiment, the main body 414 and the hydraulic chamber 416 are entirely disposed in the inner cavity 405a provided inside the front fork 405.

The main body 414 includes the housing 22 and a piston 424. The piston 424 includes a piston body 425 and a piston rod 444. The piston body 425 has the same structure as that of the piston 24 in accordance with the first embodiment. The piston rod 444 is coupled to the piston body 425. The piston rod 444 extends from the piston body 425 through the cap 43 to an outside of the housing 22. The piston rod 444 extends through the opening 405c of the front fork 405 toward the slit 405b. The piston rod 444 is configured to be in contact with the wheel 401. While the piston rod 444 is a separate member from the piston body 425 in the illustrated embodiment, the piston rod 444 can be integrally provided with the piston body 425 if needed and/or desired.

As seen in FIGS. 30 and 31, the main body 414 is configured so as to switch the hydraulic chamber 416 between the first chamber state (FIG. 30) and the second chamber state (FIG. 31) in accordance with a relative position between the housing 22 and the piston 424. One of the housing 22 and the piston 424 is configured to be in contact with the bicycle component 401 to change the relative position between the housing 22 and the piston 424. In the illustrated embodiment, the housing 22 is configured to be secured to the bicycle frame 402. The piston 424 is configured to be in contact with the bicycle component 401 to change the relative position between the housing 22 and the piston 424. More specifically, the housing 22 is secured to the front fork 405 of the bicycle frame 402. The piston 424 is configured to be in contact with the wheel 401 to change the relative position between the housing 22 and the piston 424. However, the piston 424 can be secured to the bicycle frame 402. The housing 22 can be configured to be in contact with the bicycle component 401 to change the relative position between the housing 22 and the piston 424.

As seen in FIGS. 30 and 32, the piston rod 444 is in contact with the hub axle 403a of the bicycle hub assembly 403 in the attachment state. In this state, the piston 424 is disposed at the first position P1, and the hydraulic chamber 416 is in the first chamber state. The piston rod 444 includes an end portion 444a contactable with the hub axle 403a of the bicycle hub assembly 403. The end portion 444a of the piston rod 444 is provided in the opening 405c when the hydraulic chamber 416 is in the first chamber state.

As seen in FIG. 31, the piston rod 444 is not in contact with the hub axle 403a of the bicycle hub assembly 403 in a detachment state where the wheel 401 is detached from the bicycle frame 402. In this state, the piston 424 is disposed at the second position P2, and the hydraulic chamber 416 is in the second chamber state. The end portion 444a of the piston rod 444 is provided in the slit 405b when the hydraulic chamber 416 is in the second chamber state.

As seen in FIGS. 30 and 31, the piston rod 444 is pressed by the biasing member 50 toward the second position P2. Thus, the piston rod 444 moves from the first position P1 to the second position P2 when the hub axle 403a of the bicycle hub assembly 403 is removed from the slit 405b of the front fork 405. The piston 424 reaches the second position P2 when the end portion 444a of the piston rod 444 is not in contact with the hub axle 403a. This causes the state of the hydraulic chamber 416 to be switched from the first chamber state (FIG. 30) to the second chamber state (FIG. 31).

The piston rod 444 is pressed by the bicycle hub assembly 403 of the wheel 401 when the hub axle 403a of the bicycle hub assembly 403 is inserted into the slit 405b of the front fork 405 via the wheel securing assembly 404. This moves the piston 424 from the second position P2 toward the first position P1. The piston 424 reaches the first position P1 when the hub axle 403a reaches an end of the slit 405b, causing the state of the hydraulic chamber 416 to be switched from the second chamber state (FIG. 31) to the first chamber state (FIG. 32).

With the hydraulic quick-release apparatus 412, it is possible to obtain substantially the same advantageous effect as that of the bicycle hydraulic quick-release apparatus 12 in accordance with the first embodiment. Furthermore, it is possible to switch the state of the hydraulic chamber 416 between the first and second chamber states in conjunction with attachment and detachment of the bicycle component 401 to and from the bicycle frame 402. Accordingly, it is possible to omit the switching operation of the hydraulic chamber 416, allowing the wheel 401 to be more quickly attached to and detached from the bicycle frame 402.

With the bicycle frame 402, since the frame body 405 includes the inner cavity 405a, the slit 405b, and the opening 405c connecting the slit 405b to the inner cavity 405a, it is possible to operatively couple, through the opening 405c, a component disposed in the inner cavity 405a to another component attached to the bicycle frame 402 via the slit 405b. Accordingly, it is possible to effectively use an inside of the bicycle frame 402.

Figure 33:
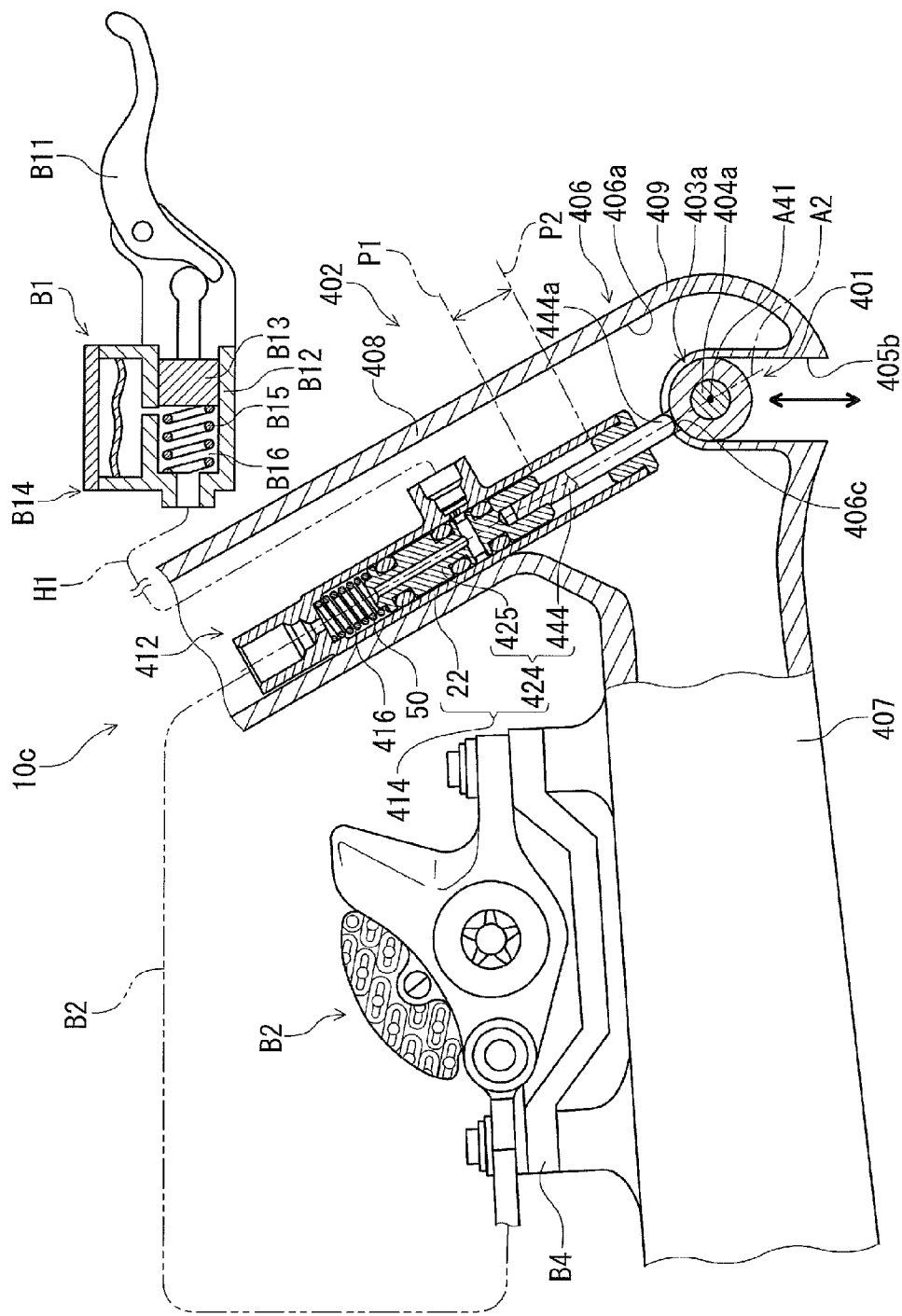
FIG. 33 is a cross-sectional view of the bicycle braking system including a bicycle hydraulic quick-release apparatus in accordance with a fifth embodiment (first position)

The arrangement of the hydraulic quick-release apparatus 412 is not limited to the illustrated embodiment. The hydraulic quick-release apparatus 412 can be disposed at positions other than the front fork 405 of the bicycle frame 402. As seen in FIG. 33, for example, the hydraulic quick-release apparatus 412 can be at least partially disposed at a rear part 406 of the bicycle frame 402. The rear part 406 includes a chainstay 407, a seatstay 408, and a rear end 409. The rear end 409 couples the chainstay 407 to the seatstay 408. The rear part 406 can be also referred to as a frame body 406.

The bicycle frame 402 comprises the frame body 406 to which the bicycle hub assembly 403 of the wheel 401 is to be attached. The frame body 406 includes an inner cavity 406a, a slit 406b, and an opening 406c. Namely, the rear part 406 includes the inner cavity 406a, the slit 406b, and the opening 406c. In the illustrated embodiment, the inner cavity 406a is defined inside the chainstay 407, the seatstay 408, and the rear end 409. The slit 406b and the opening 406c are provided at the rear end 409.

The hub axle 403a of the bicycle hub assembly 403 is to extend through the slit 406b. The opening 406c connects the slit 406b to the inner cavity 406a. The hub axle 403a and the rod 404a extend through the slit 406b in an attachment state where the wheel 401 is attached to the bicycle frame 402 (e.g., the rear part 406) via the wheel securing assembly 404. The piston rod 444 extends through the opening 406c of the rear part 406.

In such an embodiment, as seen in FIG. 33, the hydraulic chamber 416 is configured to be in the first chamber state when the bicycle component 401 (e.g., the wheel 401) is attached to the rear part 406 of the bicycle frame 402. The hydraulic chamber 416 is configured to be in the second chamber state when the bicycle component 401 (e.g., the wheel 401) is detached from the rear part 406 of the bicycle frame 402. The main body 414 is configured to be at least partially disposed in the inner cavity 406a provided inside the rear part 406. In particular, the hydraulic chamber 416 is configured to be at least partially disposed in the inner cavity 406a provided inside the rear part 406.

As seen in FIG. 33, the main body 414 is disposed inside the seatstay 408 and the rear end 409. However, the main body 414 can be disposed inside the chainstay 407 and the rear end 409 if needed and/or desired.

Furthermore, the arrangement of the bicycle hydraulic quick-release apparatus 412 is not limited to the illustrated embodiment. One of the first hydraulic hose H1 and the second hydraulic hose H2 can be omitted from at least one of the bicycle braking systems 10c and 10d if needed and/or desired. For example, the bicycle hydraulic quick-release apparatus 412 can be directly connected to one of the brake operating device B1 and the brake caliper B2. The bicycle hydraulic quick-release apparatus 412 can be integrated in one of the brake operating device B1 and the brake caliper B2 if needed and/or desired. The bicycle hydraulic quick-release apparatus 412 can be attached to or integrated in an adapter B4 (FIGS. 30 and 33) provided between the bicycle frame 402 and the brake caliper B2.

Fifth Embodiment

Figure 34:
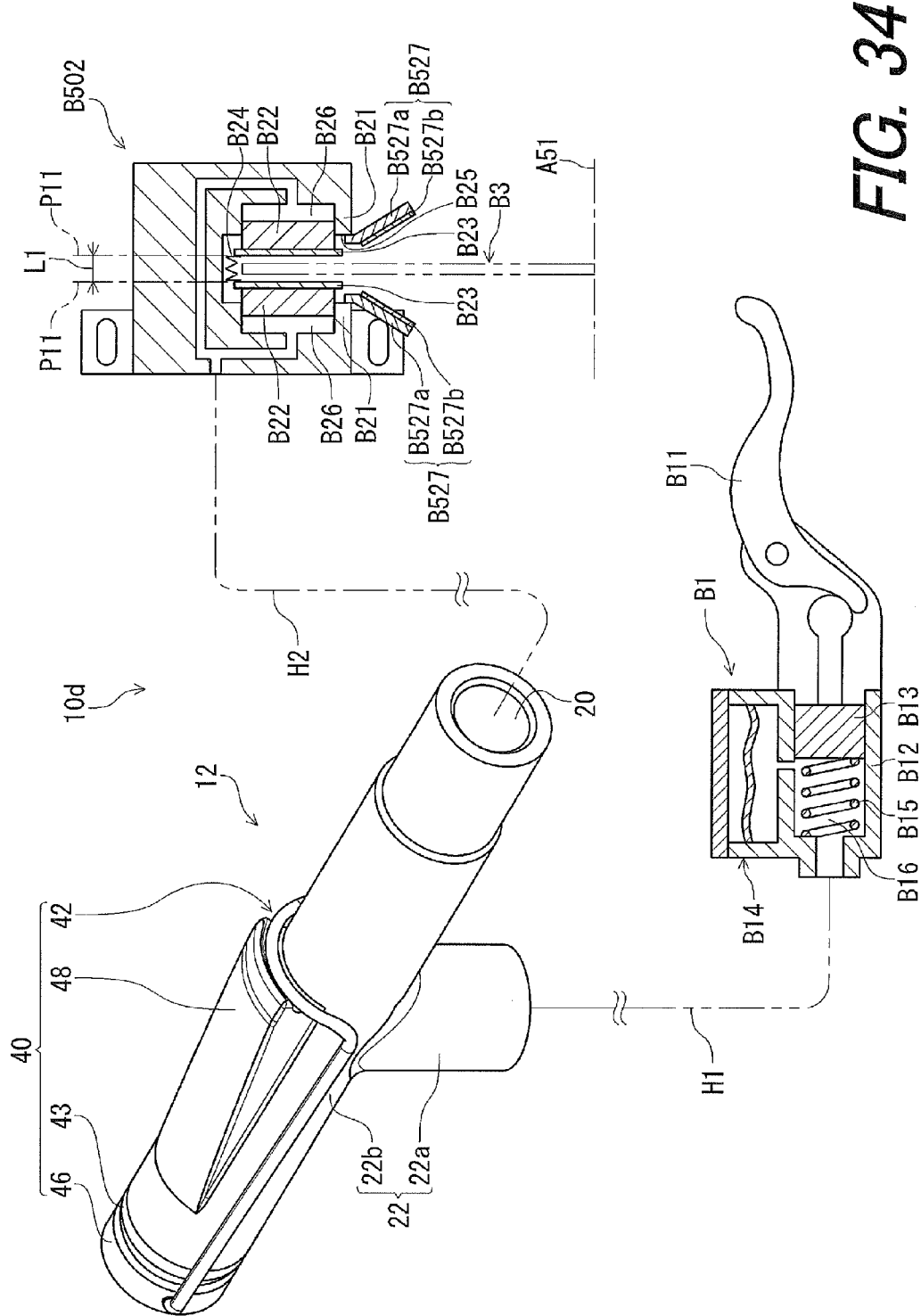
FIG. 34 is a schematic view of a bicycle braking system in accordance with a fifth embodiment including a modification of a brake caliper.

Referring to FIG. 34, a bicycle braking system 10d has the same configuration as that of the bicycle braking system 10 in the first embodiment. Thus, elements having substantially the same function as those in the above embodiments will be numbered the same here, and will not be described and/or illustrated again in detail here for the sake of brevity.

As seen in FIG. 34, the bicycle braking system 10d includes the brake operating device B1, a brake caliper B502, the disc brake rotor B3, and the bicycle hydraulic quick-release apparatus 12 in accordance with the first embodiment. Unlike the brake caliper B2 in the first embodiment, the brake caliper B502 further includes rotor guide members B527. The rotor guide members B527 are secured to the slave cylinders B21 and extend from the slave cylinders B21, respectively.

The rotor guide member B527 includes a guide body B527a and a cushioning part B527b. The guide body B527a is secured to the slave cylinder B21 and extends from the slave cylinder B21. While the guide body B527 is a separate member from the slave cylinder B21 in the illustrated embodiment, the guide body B527 can be integrally provided with the slave cylinder B21 as a single unitary member if needed and/or desired. The cushioning part B527b is secured to the guide body B527a. For example, the guide body B527a is made of a metallic material, and the cushioning part B527b is made of a non-metallic material such as rubber. The cushioning parts B527b can be omitted from the brake caliper B502 if needed and/or desired.

The rotor guide members B527 have a symmetrical shape with respect to the disc brake rotor B3. The rotor guide members B527 are arranged so that a distance between the rotor guide members B527 increases from the slave cylinder B21 toward a rotational axis A51 of the disc brake rotor B3. The rotor guide members B527 are configured to guide the disc brake rotor B3 to the slit B25 when the disc brake rotor B3 is inserted between the brake pads B23. This allows the disc brake rotor B3 to be more easily inserted between the brake pads B23.

In the present application, the term "attached" or "attaching", as used herein, can encompass configurations in which an element is directly attached to another element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hydraulic release apparatus comprising:
a main body including:
   a first hole; and
   a second hole; and
a hydraulic chamber having a changeable volume and provided between the first hole and the second hole, the hydraulic chamber being configured to be in a first chamber state where a volume of the hydraulic chamber is a first volume, the hydraulic chamber being configured to be in a second chamber state where the volume of the hydraulic chamber is a second volume different from the first volume, the hydraulic chamber being disconnected from the first hole in the second chamber state.

2. The bicycle hydraulic release apparatus according to claim 1, wherein
the second volume is greater than the first volume.

3. The bicycle hydraulic release apparatus according to claim 1, wherein
the main body includes
   a housing including a cylinder bore, and
   a piston movably provided in the cylinder bore, and
the hydraulic chamber is defined by the housing and the piston.

4. The bicycle hydraulic release apparatus according to claim 3, wherein
the first hole and the second hole are provided at the housing.

5. The bicycle hydraulic release apparatus according to claim 3, wherein
the main body is configured so as to switch the hydraulic chamber between the first chamber state and the second chamber state in accordance with a relative position between the housing and the piston.

6. The bicycle hydraulic release apparatus according to claim 5, wherein
the piston is disposed at a first position relative to the housing in the first chamber state of the hydraulic chamber,
the piston is disposed at a second position relative to the housing in the second chamber state of the hydraulic chamber,
the piston includes a fluid passageway,
the fluid passageway is connected to the first hole in a state where the piston is disposed at the first position, and
the fluid passageway is disconnected from the first hole in a state where the piston is disposed at the second position.

7. The bicycle hydraulic release apparatus according to claim 6, further comprising:
a positioning structure configured to adjustably position the piston relative to the housing.

8. The bicycle hydraulic release apparatus according to claim 7, wherein
the positioning structure is configured to position the piston at the first position so that the hydraulic chamber is in the first chamber state, and
the positioning structure is configured to position the piston at the second position so that the hydraulic chamber is in the second chamber state.

9. The bicycle hydraulic release apparatus according to claim 7, wherein
the positioning structure includes a coupling member configured to couple the piston to the housing so that the piston is positioned on at least one of the first position and the second position.

10. The bicycle hydraulic release apparatus according to claim 7, wherein
the positioning structure includes a biasing member configured to bias the piston toward the second position.

11. The bicycle hydraulic release apparatus according to claim 10, wherein
the biasing member is provided in the hydraulic chamber.

12. The bicycle hydraulic release apparatus according to claim 10, wherein
the positioning structure includes a coupling member configured to couple the piston to the housing so that the piston is positioned on at least one of the first position and the second position against a biasing force from the biasing member.

13. The bicycle hydraulic release apparatus according to claim 7, wherein
the positioning structure includes an operating member movable relative to the housing in an axial direction in which the piston is movable relative to the housing, and a knock mechanism configured to switch a position of the piston between the first position and the second position in response to axial movement of the operating member.

14. The bicycle hydraulic release apparatus according to claim 1, wherein
the hydraulic chamber is connected to the first hole and the second hole in the first chamber state.

15. The bicycle hydraulic release apparatus according to claim 1, wherein
the main body includes a flexible tube,
the flexible tube includes a first end and a second end opposite to the first end,
the first hole is provided at the first end of the flexible tube,
the second hole is provided at the second end of the flexible tube, and
the hydraulic chamber provided in the flexible tube.

16. The bicycle hydraulic release apparatus according to claim 15, wherein
the main body includes a first holding member and a second holding member, and
the second holding member is configured to hold the flexible tube together with the first holding member to restrict the flexible tube from expanding in a radial direction of the flexible tube in response to hydraulic pressure in the hydraulic chamber.

17. The bicycle hydraulic release apparatus according to claim 16, wherein
the second holding member is movable relative to the first holding member between a first position and a second position with the flexible tube being restricted from expanding in the radial direction.

18. The bicycle hydraulic release apparatus according to claim 17, wherein
the second holding member includes a pressing member configured to press the flexible tube in response to movement of the second holding member from the first position to the second position so as to change the volume of the hydraulic chamber from the first volume to the second volume.

19. The bicycle hydraulic release apparatus according to claim 18, further comprising:
a positioning structure configured to position the second holding member at the second position.

20. The bicycle hydraulic release apparatus according to claim 19, wherein
the positioning structure includes a biasing member configured to bias the second holding member toward the first position.

21. The bicycle hydraulic release apparatus according to claim 1, wherein
the hydraulic chamber is configured to be in the second chamber state when a bicycle component is detached from a bicycle frame.

22. The bicycle hydraulic release apparatus according to claim 21, wherein
the main body is configured to be provided in the bicycle frame.

23. The bicycle hydraulic release apparatus according to claim 21, wherein
the hydraulic chamber is configured to be in the first chamber state when the bicycle component is attached to the bicycle frame.

24. The bicycle hydraulic release apparatus according to claim 23, wherein
the hydraulic chamber is configured to be in the second chamber state when a wheel is detached from the bicycle frame, and
the hydraulic chamber is configured to be in the first chamber state when the wheel is attached to the bicycle frame.

25. The bicycle hydraulic release apparatus according to claim 23, wherein
the hydraulic chamber is configured to be in the second chamber state when the bicycle component is detached from a front fork of the bicycle frame,
the hydraulic chamber is configured to be in the first chamber state when the bicycle component is attached to the front fork of the bicycle frame, and
the main body is configured to be at least partially disposed in an inner cavity provided inside the front fork.

26. The bicycle hydraulic release apparatus according to claim 23, wherein
the hydraulic chamber is configured to be in the second chamber state when the bicycle component is detached from a rear part of the bicycle frame,
the hydraulic chamber is configured to be in the first chamber state when the bicycle component is attached to the rear part of the bicycle frame, and
the main body is configured to be at least partially disposed in an inner cavity provided inside the rear part.

27. A bicycle hydraulic release apparatus comprising:
a main body including:
a first hole;
a second hole;
a housing including a cylinder bore; and
a piston movably provided in the cylinder bore; and
a hydraulic chamber having a changeable volume and provided between the first hole and the second hole, the hydraulic chamber being configured to be in a first chamber state where a volume of the hydraulic chamber is a first volume, the hydraulic chamber being configured to be in a second chamber state where the volume of the hydraulic chamber is a second volume different from the first volume, the hydraulic chamber being disconnected from the first hole in the second chamber state, the hydraulic chamber being defined by the housing and the piston,
the main body being configured so as to switch the hydraulic chamber between the first chamber state and the second chamber state in accordance with a relative position between the housing and the piston,
the hydraulic chamber being configured to be in the second chamber state when a bicycle component is detached from a bicycle frame, and
one of the housing and the piston being configured to be in contact with the bicycle component to change the relative position between the housing and the piston.

28. The bicycle hydraulic release apparatus according to claim 27, wherein
the housing is configured to be secured to the bicycle frame, and
the piston is configured to be in contact with the bicycle component to change the relative position between the housing and the piston.

* * * * *